US010972932B2

(12) United States Patent
Fiorani et al.

(10) Patent No.: US 10,972,932 B2
(45) Date of Patent: Apr. 6, 2021

(54) METHODS, APPARATUS AND SYSTEMS RELATING TO DATA RADIO BEARER INACTIVITY

(71) Applicant: Telefonaktiebolaget LM Ericsson (publ), Stockholm (SE)

(72) Inventors: Matteo Fiorani, Solna (SE); Angelo Centonza, Stockholm (SE); Alexander Vesely, Feldbach (AT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 214 days.

(21) Appl. No.: 16/312,088

(22) PCT Filed: Oct. 26, 2018

(86) PCT No.: PCT/SE2018/051097
§ 371 (c)(1),
(2) Date: Dec. 20, 2018

(87) PCT Pub. No.: WO2019/098903
PCT Pub. Date: May 23, 2019

(65) Prior Publication Data
US 2020/0084655 A1 Mar. 12, 2020

Related U.S. Application Data

(60) Provisional application No. 62/587,737, filed on Nov. 17, 2017.

(51) Int. Cl.
*H04W 28/02* (2009.01)
*H04W 24/08* (2009.01)
(Continued)

(52) U.S. Cl.
CPC ....... *H04W 28/0252* (2013.01); *H04W 24/08* (2013.01); *H04W 24/10* (2013.01); *H04W 88/085* (2013.01)

(58) Field of Classification Search
CPC . H04W 28/0252; H04W 24/08; H04W 24/10; H04W 88/085; H04W 52/0222; Y02D 30/70
See application file for complete search history.

(56) References Cited

U.S. PATENT DOCUMENTS

2019/0387444 A1* 12/2019 Byun ................ H04W 36/0072

FOREIGN PATENT DOCUMENTS

WO    WO-2018164469 A1 *  9/2018  ........ H04W 36/0072

OTHER PUBLICATIONS

Byun et al., U.S. Appl. No. 62/555,050, "DU Change Procedure in CU-DU Split for NR", Sep. 7, 2017 (Year: 2017).*

(Continued)

*Primary Examiner* — Justin T Van Roie
(74) *Attorney, Agent, or Firm* — Murphy, Bilak & Homiller, PLLC

(57) ABSTRACT

An exemplary method is performed by a distributed unit of a base station. The base station further comprises a centralized unit. The method comprises: determining (1302) inactivity of one or more data radio bearers, established between the distributed unit and a user equipment, for carrying user data; determining (1304) a level of activity of one or more signalling radio bearers, established between the distributed unit and the user equipment, for carrying control data; and determining (1306), based on the level of activity of the one or more signalling radio bearers, whether to transmit, to the centralized unit, a report message comprising an indication of the activity of the one or more data radio bearers.

20 Claims, 16 Drawing Sheets

(51) Int. Cl.
*H04W 24/10* (2009.01)
*H04W 88/08* (2009.01)

(56) References Cited

OTHER PUBLICATIONS

Cognitel "LTE/EPC Fundamentals", Jan. 2016 (Year: 2016).*
3GPP, "3rd Generation Partnership Project; Technical Specification Group Radio Access Network; NG-RAN; Architecture description (Release 15)", 3GPP TS 38.401 V0.4.1, Oct. 2017, 1-25.
3GPP, "3rd Generation Partnership Project; Technical Specification Group Radio Access Network; NG-RAN; F1 application protocol (F1AP) (Release 15)", 3GPP TS 38.473 V0.4.0, Oct. 2017, 1-73.
3GPP, "3rd Generation Partnership Project; Technical Specification Group Services and System Aspects; System Architecture for the 5G System; Stage 2 (Release 15)", 3GPP TS 23.501 V1.5.0, Nov. 2017, 1-170.
Unknown, Author, "Issues on RRC-INACTIVE state in CU-DU split", 3GPP TSG-RAN WG3 Meeting #97, R3-173198, Berlin, Germany, Aug. 21-25, 2017, 1-4.
3GPP, "3rd Generation Partnership Project; Technical Specification Group Radio Access Network; Study on new radio access technology: Radio access architecture and interfaces (Release 14)", 3GPP TR 38.801 V14.0.0, Mar. 2017, 1-91.
Unknown, Author, "E1 interface functions", Ericsson, AT&T, Vodafone, Charter Communications Inc., 3GPP TSG RAN WG3 Meeting #97b, R3-173994, Prague, Czech Republic, Oct. 9-13, 2017, 1-3.
Unknown, Author, "Further discussion on the internal split RAN architecture", Ericsson, 3GPP TSG-RAN WG3 NR AdHoc Meeting #2, R3-172513, Qingdao, P.R. China, Jun. 27-29, 2017, 1-6.
Unknown, Author, "Inactivity Detection in Option 3 and 3X Architecture", Vodafone Group, 3GPP TSG-RAN WG3 97, R3-172673, Berlin, Germany, Aug. 21-25, 2017, 1-11.

* cited by examiner

METHODS, APPARATUS AND SYSTEMS RELATING TO DATA RADIO BEARER INACTIVITY

TECHNICAL FIELD

Embodiments of the disclosure relate to wireless communications networks, and particularly to methods, apparatus and systems for detecting inactive data radio bearers and performing actions triggered by detecting inactive data radio bearers in such networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The current 5G RAN (also known as Next Generation, or NG) architecture is shown in FIG. 1.

The NG architecture can be further described as follows:

The NG-RAN consists of a set of gNBs connected to the 5GC through the NG.

A gNB can support FDD mode, TDD mode or dual mode operation.

gNBs can be interconnected through the Xn.

A gNB may consist of a gNB-CU and one or more gNB-DUs.

A gNB-CU and a gNB-DU are connected via F1 logical interface.

One gNB-DU is connected to only one gNB-CU.

NG, Xn and F1 are logical interfaces. For NG-RAN, the NG and Xn-C interfaces for a gNB consisting of a gNB-CU and one or more gNB-DUs, terminate in the gNB-CU. For EN-DC, the S1-U and X2-C interfaces for a gNB consisting of a gNB-CU and gNB-DUs terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN inter ace (NG, Xn, F1) the related TNL protocol and the functionality are specified. The TNL provides services for user plane transport and signalling transport. In NG-Flex configuration, each gNB is connected to all AMFs within an AMF Region. The AMF Region is defined in 3GPP TS 23.501, v 1.5.0.

The general principles for the specification of the F1 interface are as follows:

the F1 interface is be open;

the F1 interface supports the exchange of signalling information between the endpoints, in addition the interface shall support data transmission to the respective endpoints;

from a logical standpoint, the F1 is a point-to-point interface between the endpoints (a point-to-point logical interface should be feasible even in the absence of a physical direct connection between the endpoints);

the F1 interface supports control plane and user plane separation;

the F1 interface separates Radio Network Layer and Transport Network Layer;

the F1 interface enable exchanges of UE associated information and non-UE associated information;

the F1 interface is defined to be future proof to fulfil different new requirements, support new services and new functions;

one gNB-CU and a set of one or more gNB-DUs are visible to other logical nodes as a gNB. The gNB terminates X2, Xn, NG and S1-U interfaces;

the CU may be separated in control plane (CP) and user plane (UP).

There currently exist certain challenge(s). For example, in the 4G System (EPS), the eNB constantly monitors the UE activity on a per-bearer basis. The eNB determines when a bearer has been inactive for a given amount of time, and then takes action accordingly. For example, the eNB could decide to remove a bearer that has been inactive for a given amount of time. If all the bearers of a UE have been inactive for a given amount of time, the node controlling the UE's RRC state may decide to:

either change the UE state to RRC_IDLE, removing all UE specific resources in the RAN, or, in LTE, suspend the UE connection, keeping a UE context in the RAN.

In the 5G System (5GS), a similar functionality is needed where, based on information of inactivity, an inactive data radio bearer could be removed, or, if all the DRBs of a UE have been inactive for a given amount of time, the node controlling the UE's RRC state can decide to either change the UE state to RRC_IDLE, removing all UE specific control and user plane related resources from the RAN, or send the UE to RRC_INACTIVE, while keeping necessary user and control plane related resources established in the RAN (e.g. stored in the gNB or another RAN node).

Note that, at a later point in time, RRC_INACTIVE equivalent function might be introduced into EPS as well.

SUMMARY

Certain aspects of the present disclosure and their embodiments may provide solutions to these or other challenges.

For example, in one aspect, the disclosure provides a method in a distributed unit of a base station, the base station further comprising a centralized unit. The method comprises: determining inactivity of one or more data radio bearers, established between the distributed unit and a user equipment, for carrying user data, determining a level of activity of one or more signalling radio bearers, established between the distributed unit and the user equipment, for carrying control data; and determining, based on the level of activity of the one or more signalling radio bearers, whether to transmit, to the centralized unit, a report message comprising an indication of the activity of the one or more data radio bearers.

In a further aspect, the disclosure provides a method in a network node for a wireless communication network. The method comprises: obtaining an indication of inactivity of a first data radio bearer of a plurality of data radio bearers established between a user equipment and one or more distributed units of a base station for carrying user data, the base station further comprising a centralized unit. The method further comprises, based on the indication of inactivity: removing the first data radio bearer from a radio bearer configuration for the user equipment; and transferring traffic intended for the first data radio bearer to a second data radio bearer of the plurality of data radio bearers.

Certain embodiments may provide one or more of the following technical advantage(s).

For example, by using a level of activity of a signalling radio bearer to determine whether or not to transmit an inactivity report, a UE can maintain an appropriate radio bearer configuration for its data requirements, even though radio conditions may be poor. For example, by transferring traffic to a different radio bearer or data radio bearer, and tearing down a previous radio bearer or data radio bearer, resources can again be freed for UEs which have greater resource requirements. Further, when the different radio bearer or data radio bearer is already established with a different DU, the complexity of the UE's mobility situation is reduced.

The term "a radio bearer" or "a bearer" shall be understood herein to mean the set of resources used over the air to communicate with a specific UE via a single PDCP protocol instance. Such a radio bearer could consist of radio, or over-the-air resources served by different radio transmission points, e.g. different DUs and different DRBs. The term "data radio bearer", when used in the context of a DU-CU architecture, refers to the set of over the air resources used to communicate between a CU to a UE via a specific DU. Such a DRB in this disclosure is the end-to-end channel created between the CU, the DU and the UE in order to exchange either part or all the traffic corresponding to a radio bearer.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
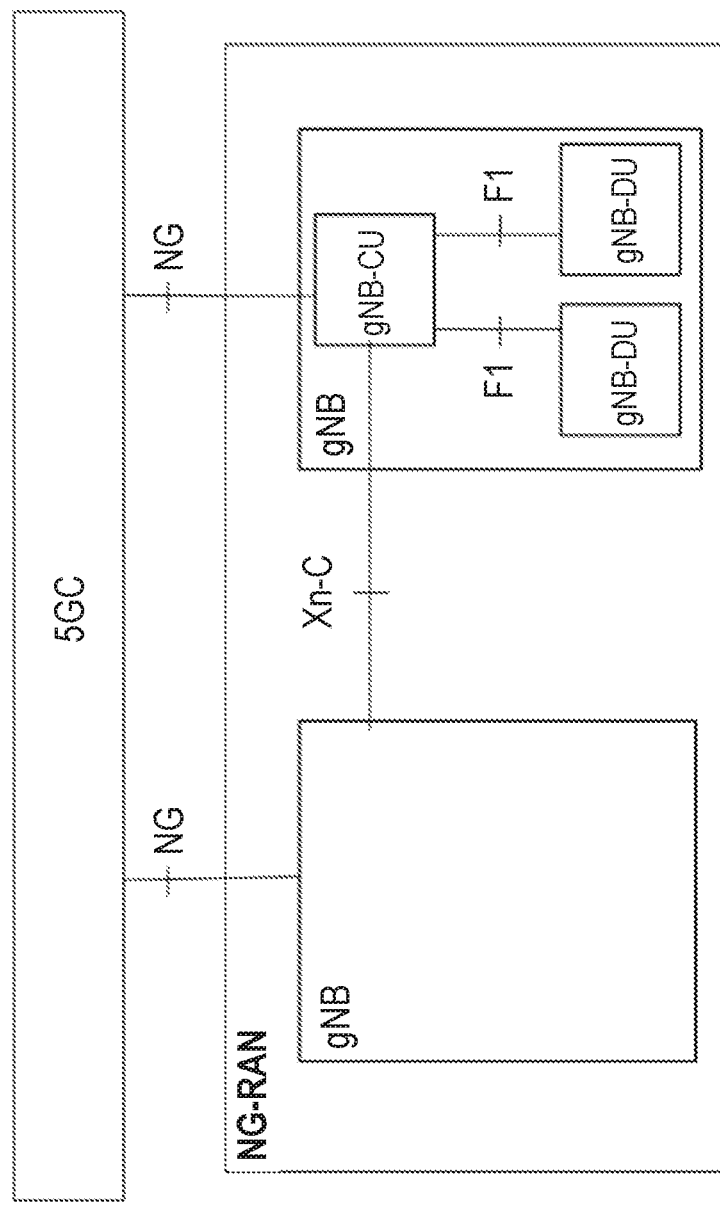
FIG. 1 shows the 5G RAN architecture as described in 3GPP TS38.401, version 0.4.1.

When a RAN node is separated into a DU (distributed unit) and CU (centralized unit), one or more lower layers of the protocol stack reside in the DU, while one or more higher layers reside in the CU. Therefore, the DU may monitor the UE activity on a per-DRB basis and report to the CU either when a DRB or a UE (i.e., all the DRBs for the UE) have been inactive for a given amount of time. The CU can then take one or more actions based on the inactivity, such as removing unused DRBs or changing the UE state, or, if the CU is hosted in a Secondary RAN node (in case of dual connectivity), reporting to the Master RAN node that all user data bearers for which the secondary RAN node provide resources, have been inactive for a given amount of time.

Note that separation of a RAN node into DUs and a CU is currently only implemented for gNBs, i.e. RAN nodes providing NR access only are separated into gNB-DUs and a gNB-CU. This may change at a later point in time, when separation into CU and DUs is also applied for RAN nodes providing E-UTRA or both NR access and E-UTRA, with a respective interface specified between the CU and DU, either based on F1 or a new interface, deployed in an EPS or 5GS. Accordingly embodiments described herein are applicable to all radio access technologies in which a base station or similar radio access network node can be implemented in a split architecture, with a first node (called the centralized node herein) providing functionality of one or more higher layers in the protocol stack, and one or more second nodes (called distributed nodes herein) providing functionality or one or more lower layers in the protocol stack. For example, the gNB-CU may host the RRC, SDAP and PDCP layers. The gNB-DU may host RLC, MAC and PHY layers.

It should be further noted that RAN resources for data radio bearers allocated for a UE can be provided by multiple DUs. A CU serving the UE may therefore receive inactivity indications from all connected DUs serving the same UE. Further, as mentioned above, in case of dual connectivity, more than one CU may be involved in serving a UE, one belonging logically to a Master RAN node, and one or more belonging logically to one or more Secondary RAN nodes. By receiving information from all DUs the CU connected to it can have a correct understanding of DRBs, or bearers or UE inactivity as far as the controlling CU is concerned. This is because a single bearer may be split between the CU and different DUs serving the UE (e.g. using different DRBs). Namely data traffic belonging to the same service (e.g., belonging to a QoS Flow) can be transmitted to the UE by means of two channels (e.g. DRBs): one over a first DU and another over a second DU. To understand whether the service is inactive a CU may need to receive inactivity indications from both the first and second DUs. Similarly, to understand if a UE is inactive the CU may need to have feedback from all the connected DUs that are serving the UE. In case of Dual Connectivity, the CU that logically belongs to the Master RAN node may host the function that finally decides the RRC State for the UE, hence making the final decision whether a UE shall be sent to RRC_INACTIVE (or to RRC_IDLE or be kept in RRC_CONNECTED).

Various solutions are disclosed for reporting UE activity information over the F1, the X2 and Xn interfaces. This allows the network to determine if a UE or a bearer or a DRB has been inactive for a given amount of time.

The disclosure provides at least two classes of solutions, one in which the CU (e.g. the user plane entity hosted by the CU) monitors UE and bearer/DRB inactivity, and another in which the DUs monitor bearer/DRB inactivity and send information to the CU.

For the case where the CU performs monitoring of bearers and UE's inactivity, monitoring may happen at UP level, e.g., at the PDCP instance used for UP traffic. Eventual information on inactivity may be passed to the CP functions of the CU responsible for UE state change or bearer setup/tear down, so that such functions can take appropriate decisions. In case that a standardized interface is utilized between the CP and UP functions, such as the E1 interface that is currently being studied in 3GPP, the inactivity information may be added to such an interface.

For the case of DU's signaling inactivity information to the CU two possible mechanisms for including UE activity information over the F1 interface are described as follows:

introduce a new CP procedure in the F1AP specifications: This involves defining a new UE-associated and DU-initiated procedure. The procedure could be class 1 or class 2 (i.e. respectively, requiring a response to an initial message, or not requiring any response to an initial message). The DU may initiate the procedure by sending a message to the CU including information on whether the UE is active or inactive. For example, the DU may declare that the UE is inactive when all its bearers/DRBs have not been used for data transmission for a certain amount of time. The message may also include information about activity per-bearer/DRB. In case of a class 1 procedure, the gNB-CU may respond with an acknowledgment that the data has been received correctly.

Employ the F1AP UE Context Modification Required procedure: Another option is to rely on the existing F1AP UE Context Modification Required procedure, which is a UE-associated and gNB-DU initiated procedure as described in TS 38.473 (version 0.4.0). The UE Context Modification Required procedure is class 1. The DU may initiate the procedure by sending the UE Context Modification Required messages, and the CU may report the successful update of the UE Context in a UE Context Modification Confirm message. The UE Context Modification Required message could be enhanced with a new IE that carries information about UE activity and optionally also information about bearer/DRBs activity.

In both options above and in the case where the UE is served by multiple logical RAN nodes (such as cases of dual connectivity within NR across different gNBs or dual connectivity between LTE and NR or dual connectivity within LTE), information about inactivity may be signaled over interfaces between such RAN nodes. For example, this information may be signaled over the X2 (in case of EPS) or Xn interface (in case of 5GS). The information may be used to determine at the RAN node in control of UE RRC state changes whether a UE can be moved to e.g. idle state or Inactive state or if the UE connection can be suspended (note that, according to the current status of 3GPP specification, "suspension of the UE connection" is presently applicable for EPS, while RRC_INACTIVE is presently applicable for 5GS, but this may change in future development of the specifications). Also, the information may also be provided to the node responsible for bearer/DRB management to decide whether to remove an inactive bearer/DRB or not. Similarly as for the F1 interface, two possible solutions for sending inactivity indication over the X2 or Xn interface are:

Introduce a new X2AP/XnAP procedure e.g., a new UE-associated and SN-initiated class 2 procedure. The SN uses this procedure to indicate the inactivity on per-UE and/or per-bearer basis to the MN.

Employ an existing X2AP/XnAP procedure e.g., the "SN initiated SN modification" procedure and add a new IE that carries information about inactivity on a per-UE or per-bearer basis.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

One or more of the embodiments discussed below may require a mechanism for the monitoring and/or reporting of UE activity or inactivity. These mechanisms may be classified into two groups: one in which a centralized unit of a base station monitors activity of a UE and/or one or more data radio bearers established with the UE; and one in which a distributed unit of a base station monitors activity of a UE and/or one or more data radio bearers established with the UE. In the following, we provide two example call-flows, or signaling diagrams, that illustrate embodiments failing in the latter category. Thus, the signalling diagrams may be used to provide information about the UE activity from a gNB-DU to gNB-CU over a suitable interface established between them (e.g. the F1 interface).

Example 1: UE Activity Information Provided Using a New Class 2 F1AP Procedure

Figure 2:
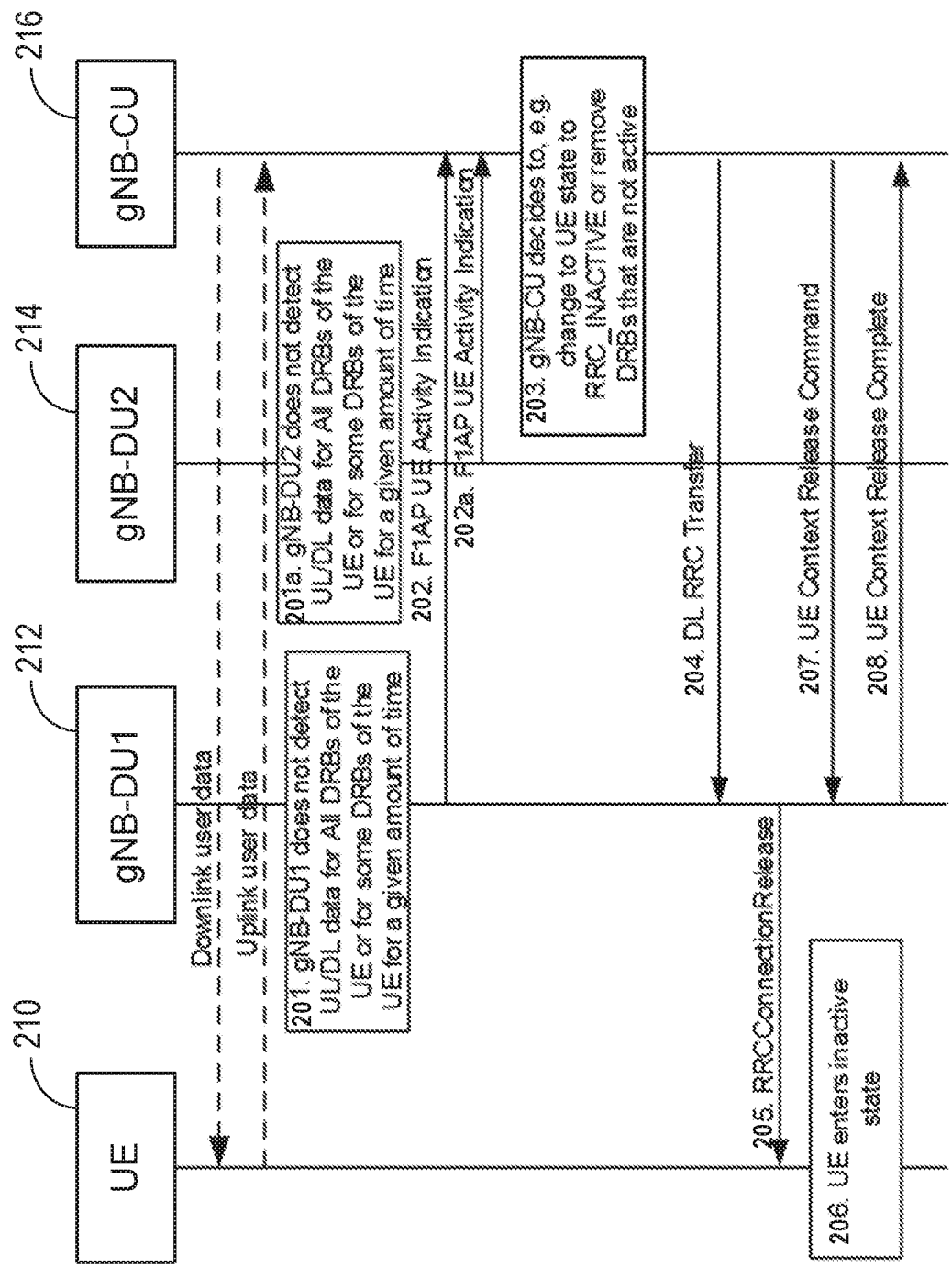
FIG. 2 is a signalling diagram relating to detection and reporting of UE/DRB activity according to embodiments of the disclosure.

In this embodiment, shown in FIG. 2, a call-flow is presented that shows how the information about UE activity can be provided from gNB-DU 212, 214 to gNB-CU 216 using a new UE-associated, gNB-DU initiated, class 2 F1AP procedure.

The UE 210 is connected to the network and can transmit and receive data via a single or multiple DUs 212, 211 and/or via a single or multiple RAN nodes. One or more data radio bearers (DRBs) may be established between the UE and each DU for the transfer of user data. In addition, one or more signalling radio bearers (SRBs) may be established between the UE and at least one DU for the transfer of control data and signalling.

Step 201. The gNB-DU 212, 214 monitors UE activity (e.g. constantly, periodically, or on an ad hoc basis), and determines that the UE (i.e., all the DRBs of this UE) has not been transmitting or has not received data for a given amount of time, or has transmitted or received relatively little data for the given amount of time. In the former case, the gNB-DU may initiate or reset a timer upon the UE transmitting or receiving data, and determine that the UE is inactive upon the timer expiring without having been reset. In the latter case, for example, the DU may compare the amount of data transmitted or received within a rolling window to a threshold, and determine that the UE is inactive if that amount of data is below the threshold. Alternatively, the DU may determine that one or more DRBs have been inactive for a given, amount of time. The embodiments recited above with respect to the determination that the UE is inactive apply equally to the determination, that a particular ORB is inactive. In the example of FIG. 2, where DRBs are established between the UE and two gNB-DUs (gNB-DU1 and gNB-DU2), each gNB-DU monitors the activity of DRBs established between the respective DU and the UE.

Step 202. The gNB-DU sends, to the gNB-CU 216, a FPA UE Activity Indication message. The message may be transmitted over an interface between the two nodes, such as the F1 interface. The message may comprise an indication that the UE or certain DRBs have been determined as inactive (i.e. as in step 201 above). The message may thus comprise a single indication in respect of the UE, that all DRBs established between the gNB-DU and the UE have been determined as inactive. Alternatively, or additionally, the message may comprise respective indications for each of the DRBs established between the gNB-DU and the UE as to whether the particular DRB has been determined as inactive. The indications may be explicit or implicit. In the former case, separate indications may be provided for each DRB, as to whether the particular DRB is active or inactive. In the latter case, an indication may be provided by the presence or absence of a particular indication; for example, the message may comprise explicit indications for only those DRBs which have been determined as inactive (or conversely as active). The absence of an indication for a particular DRB from the message may be interpreted by the gNB-CU as the DRB being active (or conversely inactive). In the example of FIG. 2, both gNB-DUs determine that the UE (or one or more DRBs) has been inactive and transmit respective messages to the gNB-CU.

Step 203. With this information, the CU 216 may determine a level of inactivity of the UE, and take one or more actions based on that level of inactivity.

For example, the CU may determine that all bearers associated with the UE are inactive and therefore the UE as a whole is inactive. Alternatively, the CU may determine that the UE is not inactive as a whole, but that one or more DRBs are inactive. In the former case, the gNB-CU, if it hosts the function that determines the RRC state, may decide to change the UE state from its existing state (e.g., associated with relatively high power consumption and/or relatively high resource usage) to a new state (e.g. associated with lower power consumption and/or lower resource usage). For example, the UE may be changed from RRC_CONNECTED to a state such as RRC_INACTIVE or RRC_IDLE. In the latter case, if the gNB-CU hosts the function for ORB management (e.g. the PDCP entity), the gNB-CU may decide to remove (e.g. tear down) one or more DRBs configured for the UE (e.g. one or more, or all, of the DRBs indicated as inactive). If the gNB-CU does not host the function which decides RRC state, or manages DRBs, it may transmit an inactivity report message to the network node(s) hosting such functions. For example, in the case of dual connectivity, the gNB-CU, which may reside in a secondary gNB for the UE, may transmit the inactivity report message to the master gNB (e.g. over the X2 or Xn interface). This information enables the node controlling UE state changes and DRB management to either change the UE state or remove inactive DRBs (for example).

In the illustrated embodiment, the gNB-CU determines that the UE as a whole is inactive, and decides to change the state of the UE to RRC_INACTIVE:

Step 204. The gNB-CU 216 sends a DL RRC Transfer message to the gNB-DU that includes an RRCConnectionRelease message to be forwarded to the UE transparently.

Step 205. The gNB-DU 212 sends the RRCConnectionRelease message to the UE.

Step 206. The UE 210 enters RRC_INACTIVE state (i.e. a low-power state).

Step 207. The gNB-CU 216 sends an F1AP UE Context Release Command to the gNB-DU.

Step 208. The gNB-DU 216 removes the UE Context, frees the corresponding resource, and responds with a UE Context Release Complete message.

For the case where bearers are removed due to inactivity, the gNB-CU 216 may send a UE Context Modification Request to the DUs for which DRBs need to be removed. Such message may comprise a list of DRBs to be removed. The CU may also send an RRC Reconfiguration message to the UE.

Thus in the embodiment described above with respect to FIG. 2, the transmission of an inactivity report (e.g. the F1PA UE Activity indication message) by the gNB-DU is event-triggered, e.g., upon detection of inactivity in one or more (or all) DRBs established with the gNB-DU. In alternative embodiments, the gNB-DU may be configured (e.g. by the gNB-CU) to report activity messages to the gNB-CU on a periodic basis, i.e. not event-triggered. In this case, the activity report message transmitted by the gNB-DU may comprise an indication of the UE or the DRBs which have been determined as inactive (i.e. as above), or an indication of the level of activity of the UE or the DRBs. In the latter case, the indication may comprise an indication of an amount of data transmitted or received by the UE (or the DRB) within a particular time window, e.g. a rolling time window. The gNB-CU may then determine whether the UE (or particular DRBs) are inactive, e.g., by comparing the indicated level of activity to a threshold, or resetting a timer upon each transmission or reception of data, and determining that the UE (or DRB) is inactive when the level of activity is below the threshold, or the timer expires.

Figure 3:
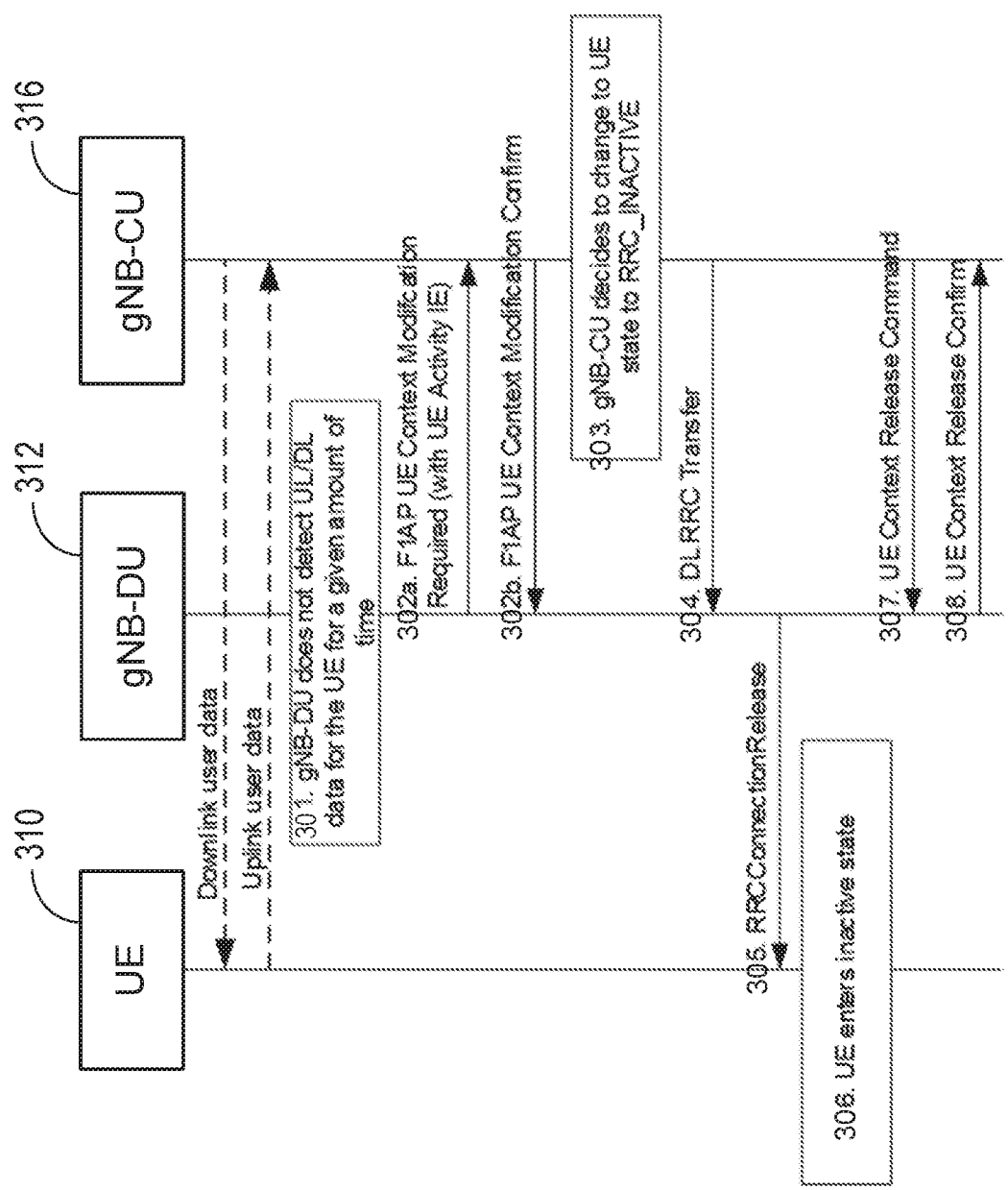
FIG. 3 is a signalling diagram relating to detection and reporting of UE/DRB activity according to further embodiments of the disclosure.

Example 2: UE Activity Information Provided Using a UE Context Modification Required In this embodiment, shown in FIG. 3, a call-flow is presented that shows how the information about UE activity can be provided from gNB-DU 312 to gNB-CU 316 using a F1AP UE-associated, gNB-DU initiated, class 1 F1AP UE Context Modification Required procedure in TS 38.473 (version 0.4.0).

The procedure is similar to that described with respect to FIG. 2, but instead of a UE Activity Report procedure (in steps 202 and 202a), the UE Context Modification procedure is used with the addition of new IEs indicating per UE or per DRB inactivity (in steps 302a and 302b. Thus, the inactivity report from the gNB-DU 312 to the gNB-CU 316 comprises a UE Context Modification message, having an indication (e.g. one or more IEs) of the level of activity of the UE 310 or the DRBs associated with the UE 310. Otherwise, steps 301, 303, 304, 305, 306, 307 and 308 are similar to their respective counterparts in FIG. 2.

As noted above, in a further category of embodiments, the CU performs monitoring of UE activity/inactivity.

As with the embodiments described above with respect to FIG. 2, the UE is connected to the network and can transmit and receive data via a single or multiple DUs and/or via a single or multiple RAN nodes. One or more DRBs may be established between the UE and each DU for the transfer of user data. In addition, one or more SRBs may be established between the UE and at least one DU for the transfer of control data and signalling.

The gNB-CU monitors UE activity (e.g. constantly, periodically, or on an ad hoc basis), and may determine that the UE (i.e., all the DRBs of this UE) has not been transmitting or has not received data for a given amount of time, or has transmitted or received relatively little data for the given amount of time. In the former case, the gNB-CU may initiate or reset a timer upon the UE transmitting or receiving data, and determine that the UE is inactive upon the timer expiring without having been reset. In the latter case, for example, the CU may compare the amount of data transmitted or received within a rolling window to a threshold, and determine that the UE is inactive if that amount of data is below the threshold. Alternatively, the CU may determine that one or more DRBs have been inactive for a given amount of time. The embodiments recited above with respect to the determination that the UE is inactive apply equally to the determination that a particular DRB is inactive.

The gNB-CU may comprise separate entities handling user plane (UP) functions and control plane (CP) functions. For example, the gNB-CU may comprise one or more CU-UP entities and one or more CU-CP entities. According to embodiments of the disclosure, the CU-UP entity may monitor the activity of the UE (or DRBs). Further, as noted above, the gNB-CU may implement one or more higher layers of a protocol stack. In some embodiments of the disclosure, one of these layers (e.g. the PDCP layer) in the CU-UP entity may be used to monitor the activity of the UE or of one or more DRBs established.

The CU-UP may then send, to the CU-CP, a report message comprising an indication of the activity of the UE or one or more radio bearers of the UE. The message may be transmitted over an interface between the two nodes, such as the E1 interface. The message may comprise an indication that the UE or certain DRBs have been determined as inactive. The message may thus comprise a single indication in respect of the UE, that all DRBs established between the gNB and the UE have been determined as inactive. Alternatively, or additionally, the message may comprise respective indications for each of the DRBs established between the gNB and the UE as to whether the particular DRB has been determined as inactive. The indications may be explicit or implicit. In the former case, separate indications may be provided for each DRB, as to whether the particular DRB is active or inactive. In the latter case, an indication may be provided by the presence or absence of a particular indication; for example, the message may comprise explicit indications for only those bearers which have been determined as inactive (or conversely as active). The absence of an indication for a particular bearer from the message may be interpreted by the CU-CP as the bearer being active (or conversely inactive).

With this information, the CU-CP may take one or more actions based on the level of inactivity in the UE.

For example, the CU-CP may determine that all bearers associated with the UE are inactive and therefore the UE as a whole is inactive. In the former case, the CU-CP, if it hosts the function that determines the RRC state, may decide to change the UE state from its existing state (e.g., associated with relatively high power consumption and/or relatively high resource usage) to a new state (e.g. associated with lower power consumption and/or lower resource usage). For example, the UE may be changed from RRC_CONNECTED to a state such as RRC_INACTIVE or RRC_IDLE.

Alternatively or additionally, the CU-CP may determine that the UE is not inactive as a whole, but that one or more DRBs are inactive, in the latter case, if the CU-CP hosts the function for DRB management (e.g. the PDCP entity), the CU-CP may decide to remove (e.g. tear down) one or more DRBs configured for the UE (e.g. one or more, or all, of the DRBs indicated as inactive).

If the gNB-CU does not host the function which decides RRC state, or manages DRBs, it may transmit an inactivity report message to the network node(s) hosting such functions. For example, in the case of dual connectivity, the gNB-CU, which may reside in a secondary gNB for the UE, may transmit the inactivity report message to the master gNB (e.g. over the X2 or Xn interface). This information enables the node controlling UE state changes and DRB management to either change the UE state or remove inactive DRBs (for example).

In a first aspect, the disclosure provides methods, apparatus, and systems in which a UE can be moved to a lower transmission frequency upon a determination that the UE is inactive, or one or more radio bearers, or data radio bearers for the UE is inactive. The method may be carried out in a network node which is responsible for CP functions for the UE, such as a CU-CP entity in a base station centralized unit. If the UE is operative in a dual connectivity mode, the method may be carried out in a CU-CP of the master base station.

The network node may obtain an indication of inactivity of a radio bearer or a data radio bearer according to any of the mechanisms described above (e.g. CU or DU monitored activity). Based on the indication of inactivity, the network node may initiate a procedure to alter a radio bearer or a data radio bearer configuration for the UE from a first (i.e. current) radio bearer configuration or data radio bearer configuration to a second (i.e. new) radio bearer configuration or data radio bearer configuration. The second configuration may comprise a radio bearer or a data radio bearer at a lower transmission frequency or lower transmission frequencies than the first configuration. For example, the radio bearer or data radio bearer having the highest transmission frequency in the second configuration may have a lower transmission frequency than the radio bearer or data radio bearer having the highest transmission frequency in the first configuration.

The network node may further determine the overall resources needed to serve the UE, and compare those overall resources to the resources available in the first configuration. If the overall resources are less than the available resources in the first configuration, the network node may initiate the procedure to change the configuration for the UE to the second, lower-frequency configuration.

Thus according to the first aspect, greater resources are reserved on higher frequency bands for more resource-hungry UEs.

In a second aspect, the disclosure provides methods, apparatus, and systems in which a base station distributed unit can determine whether or not to transmit an inactivity report to a centralized unit of the base station. Thus the second aspect is particularly relevant to the embodiments set out above with respect to FIGS. 1 and 2, and may be combined with those embodiments.

According to the second aspect, upon detecting inactivity on one or more data radio bearers, the gNB-DU determines whether the UE inactivity is due to lack of traffic over the services served by a given bearer/DRB or whether it is due to poor radio conditions. For example, the DU may determine that the UE is able to report at least some control information, such as measurements, over a signalling radio bearer (SRB) established between the gNB-DU and the UE. However, the UE is unable to transmit user-plane traffic due to poor radio channel conditions. In this case, the gNB-DU may infer that the lack of activity on the data radio bearer(s) is due to poor radio channel conditions, and refrain from sending an indication of inactivity to the gNB-CU because this indication may lead to the erroneous understanding that the DRB in question is not utilized due to lack of traffic. If relatively little control information is received over the SRB, the distributed unit may infer that the inactivity is due to a lack of traffic for the DRB in question, and the inactivity report may be transmitted to the CU.

For example, the distributed unit may compare the level of activity on the SRB to one or more threshold values, and determine whether to transmit the inactivity report based on the outcome of the comparison. If the level of activity is above the threshold, the DU may refrain from transmitting the inactivity report; if the level of activity is below the threshold, the DU may transmit the inactivity report. The level of activity may be determined by counting transmitted packets of data over a given time window (e.g. a rolling time window of a certain duration).

In a third aspect, the disclosure provides methods, apparatus, and systems in which traffic from multiple radio bearers or multiple data radio bearers may be combined on to a single radio bearer or a single data radio bearer upon a determination of UE inactivity. Methods according to the third aspect may be carried out in a network node responsible for radio bearer or DRB configuration, such as a base station CU. If the UE is operative in a dual connectivity mode, the method may be carried out in a CU-CP of the master base station.

The network node may obtain an indication of inactivity of a first radio bearer or a first data radio bearer according to any of the mechanisms described above (e.g. CU or DU monitored activity). According to the third aspect, the UE is configured with multiple radio bearers and/or multiple data radio bearers, and thus the indication of inactivity is for a subset of one or more of those configured radio bearers or data radio bearers. Based on the indication of inactivity, the network node may decide to remove some bearers/DRBs and to move traffic of these bearers/DRBs to other bearers/DRBs serving the UE. For example, the network node may decide to remove (e.g. tear down) some or all of those bearers/DRBs which are indicated as inactive (i.e. the first radio bearer or first data radio bearer). Traffic intended for the first radio bearer or the first data radio bearer is then transferred to a second radio bearer or a second data radio bearer of those which are configured.

The first radio bearer or the first data radio bearer may be established between the UE and a first distributed unit, while the second radio bearer or the second data radio bearer may be established between the UE and a second distributed unit. The first and second distributed units may belong to the same base station or to different base stations (i.e. in the case of dual connectivity). The decision to remove or tear down the first bearer/DRB and transfer the traffic to the second bearer/DRB may be further based on the network node determining whether the transfer of traffic would cause a traffic overload situation in the second distributed unit. For example, the network node may determine the total traffic which would be handled by the second distributed unit following the transfer (i.e. the traffic intended for the first bearer/DRB and the second bearer/DRB), and compare that total traffic to a threshold indicating overload. If the total traffic would exceed the threshold, the network node may determine not to tear down the first bearer/DRB and transfer the traffic to the second bearer/DRB. If the total traffic does not exceed the threshold, the network node may determine to tear down the first bearer/DRB and transfer the traffic to the second bearer/DRB.

Certain embodiments according to the third aspect may be especially applicable in scenarios where it is more beneficial to maintain traffic exchange over a single transmission point. This may be the case where a bearer/DRB level of inactivity implies that very little traffic is exchanged over such bearer/DRB. However, from a radio point of view having multiple transmission points serving the same UE may result in a more difficult mobility condition, where channel conditions of the multiple transmission points may change differently. Therefore, it might be beneficial to move the traffic exchanged via the bearer/DRB with low levels of activity to another bearer/DRB and reduce the transmission points to the UE.

Figure 4:
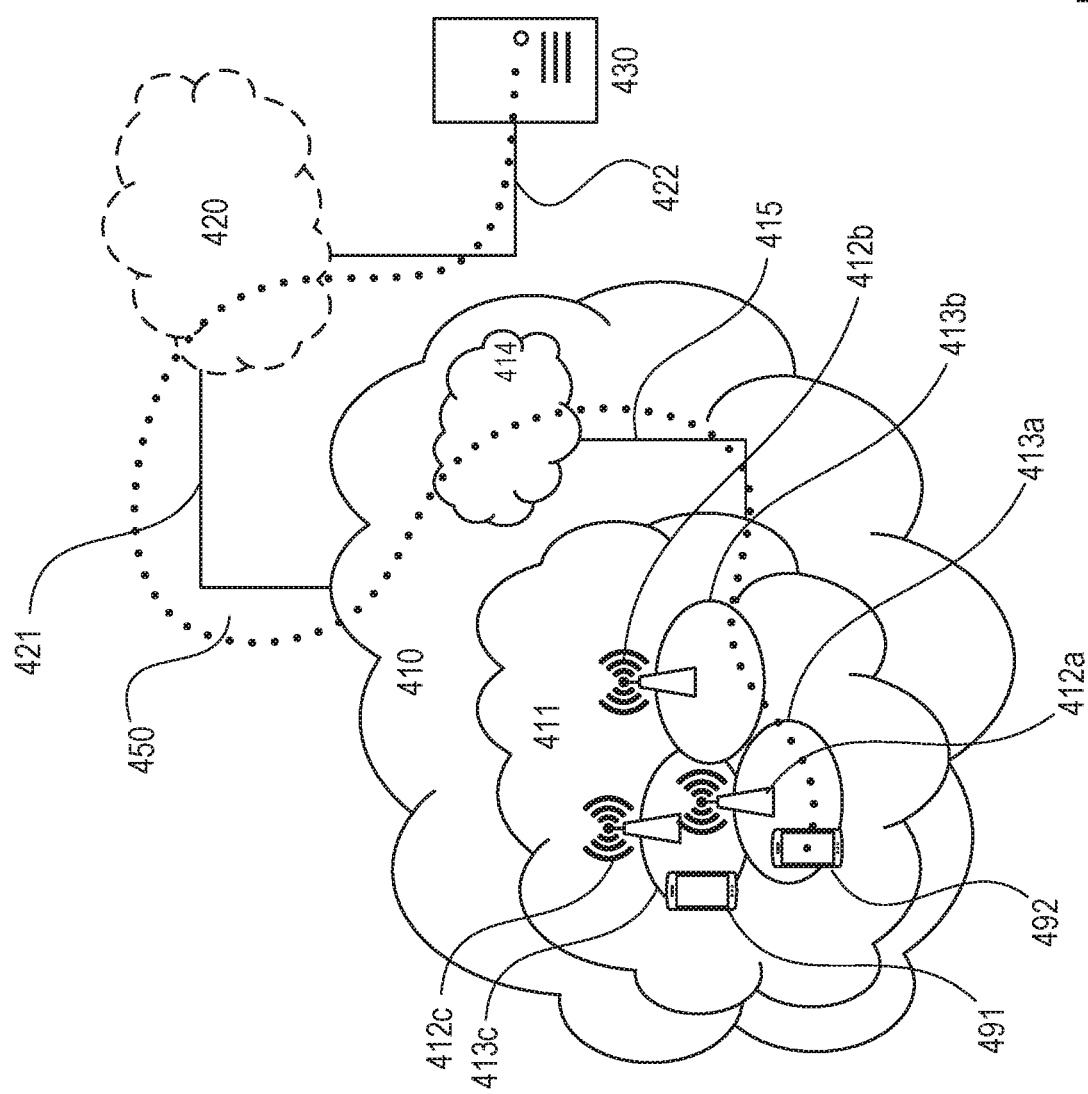
FIG. 4 shows a telecommunication network connected via an intermediate network to a host computer according to embodiments of the disclosure.

With reference to FIG. 4, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 192 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 5. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 5:
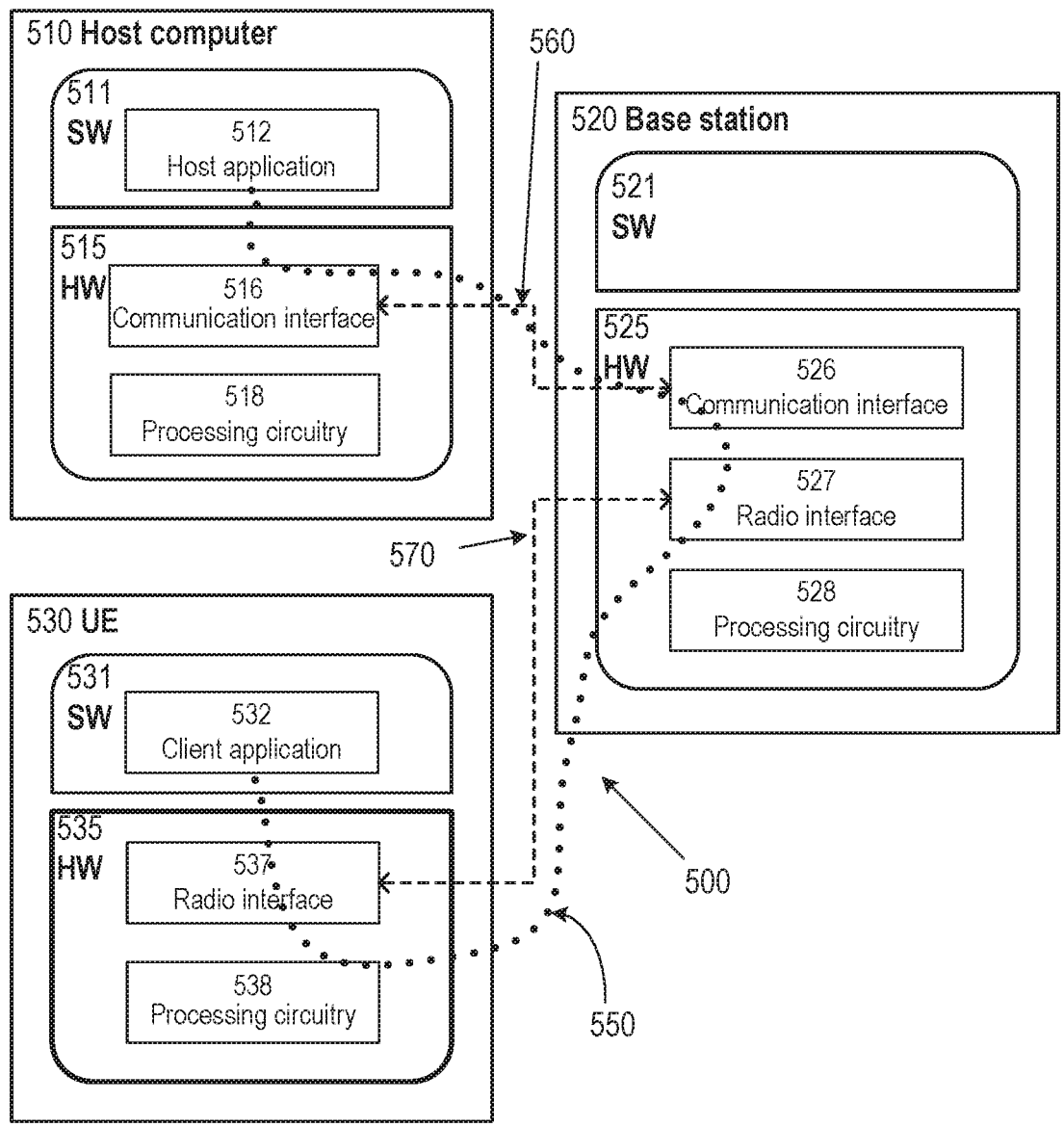
FIG. 5 shows a host computer communicating via a base station with a user equipment over a partially wireless connection in accordance with embodiments of the disclosure.

It is noted that host computer 510, base station 520 and UE 530 illustrated in FIG. 5 may be similar or identical to host computer 430, one of base stations 412a, 412b, 412c and one of UEs 491, 492 of FIG. 4, respectively. This is to say, the inner workings of these entities may be as shown in FIG. 5 and independently, the surrounding network topology may be that of FIG. 4.

In FIG. 5, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may free resources for allocation in the network and thereby provide benefits such as reduced user waiting time, better responsiveness and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 6:
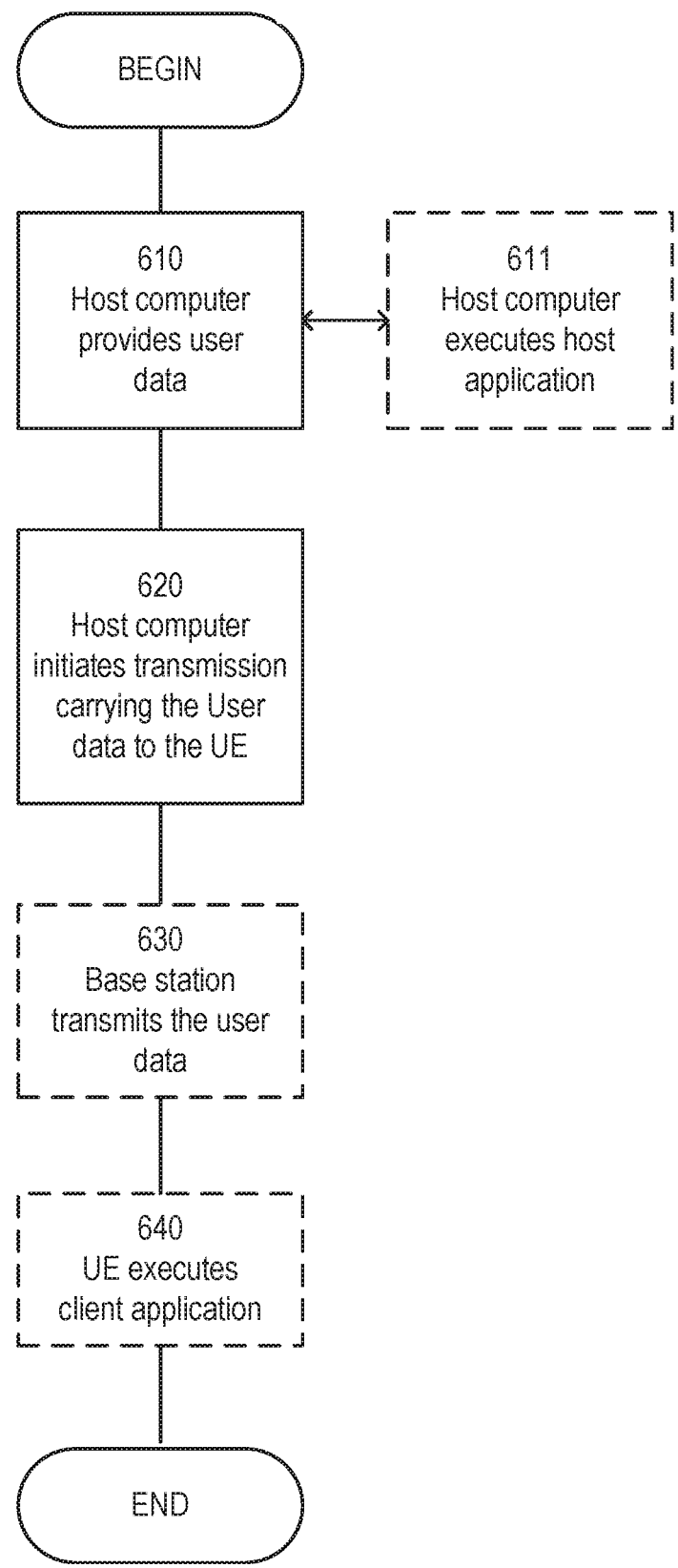
FIGS. 6 to 9 are flowchart of methods implemented in a communication system including a host computer, a base station and a user equipment according to embodiments of the disclosure.

FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 7:
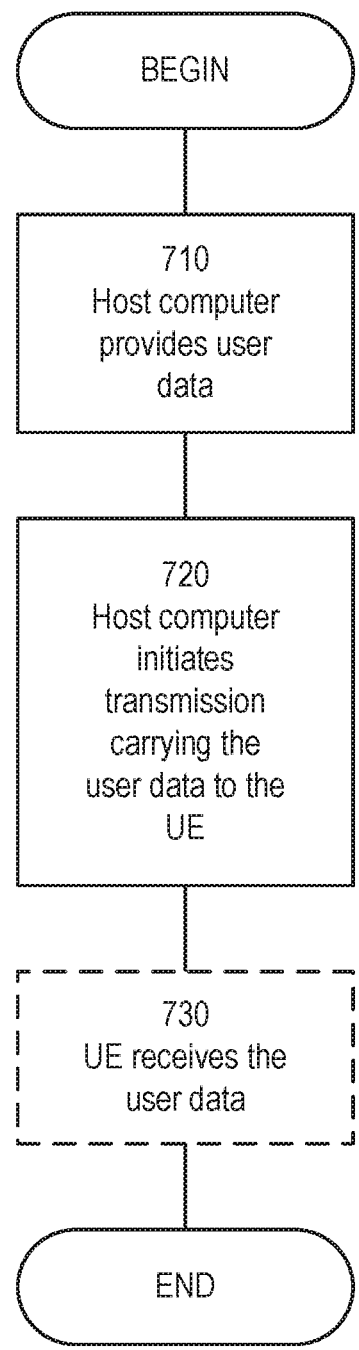

FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 8:
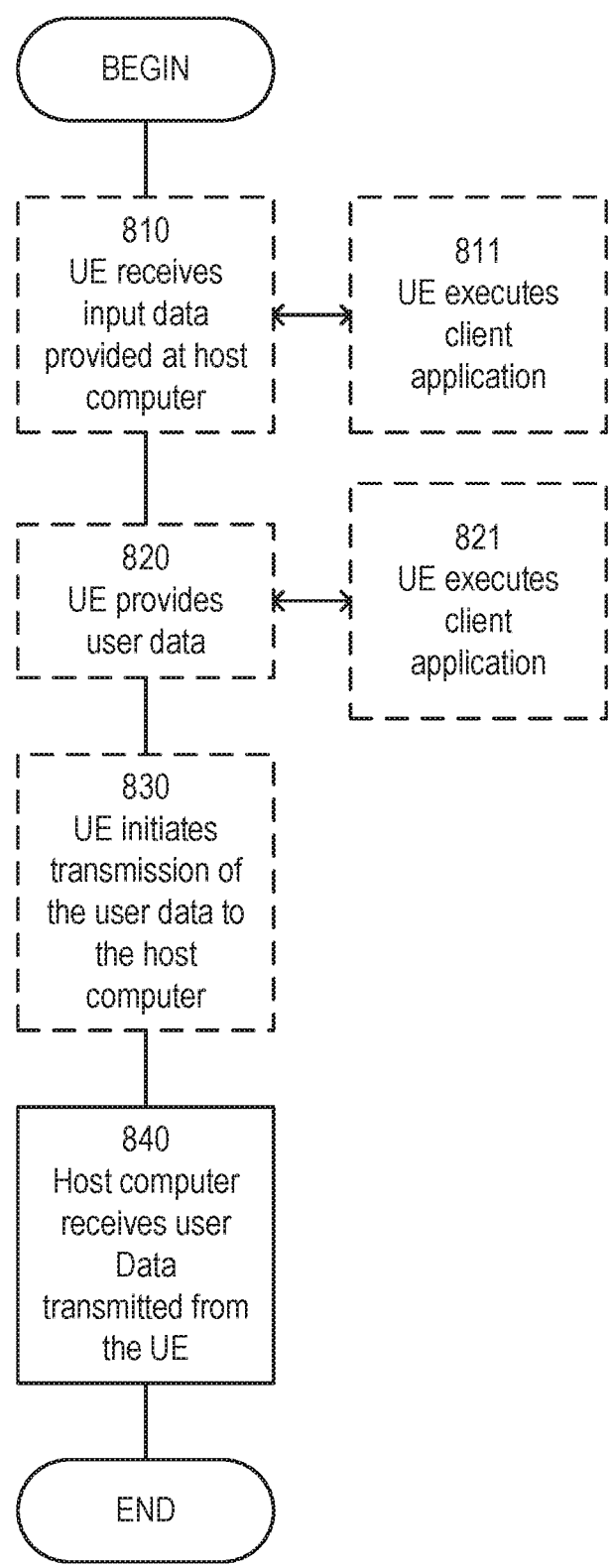

FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 9:
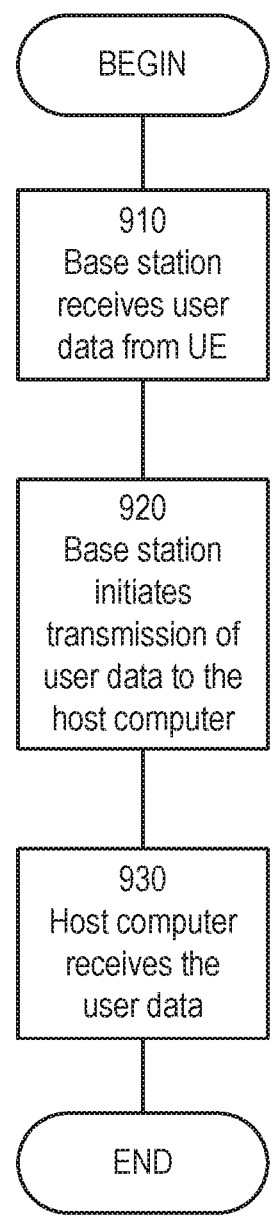

FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 10:
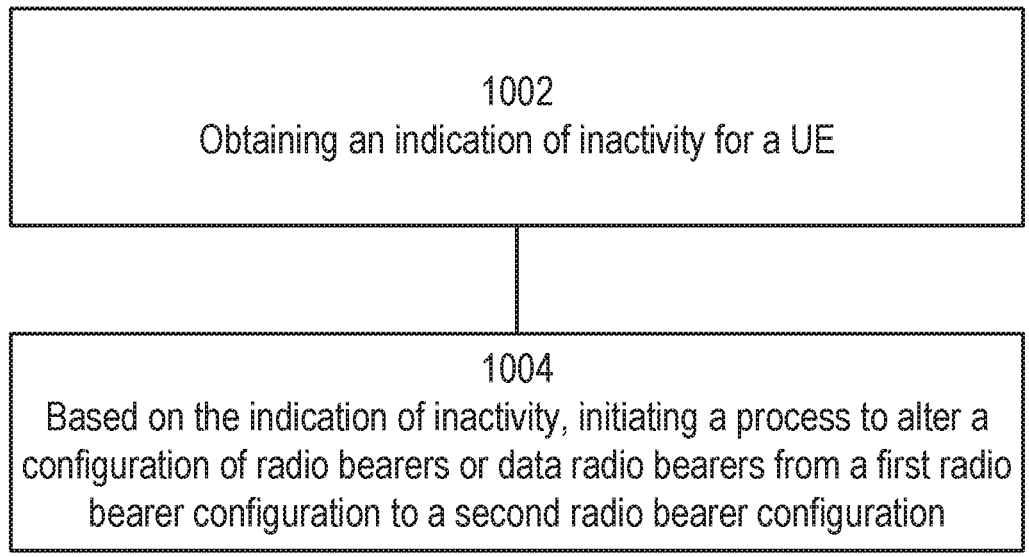
FIG. 10 is a flowchart of a method implemented in a network node according to embodiments of the disclosure.

FIG. 10 depicts a method in accordance with particular embodiments. The method may be carried out in a network node for a wireless communication network, such as a centralized unit of a base station (e.g., in dual connectivity scenarios, a master base station, eNB or gNB). The base station may further comprise a distributed unit. The method begins at step 1002, in which the network node obtains an indication of inactivity for a UE. The indication may relate to inactivity in one or more of: one or more data radio bearers established between a user equipment and a distributed unit of a base station for carrying user data, the base station further comprising a centralized unit; and one or more radio bearers established between a user equipment and a base station. In step 1004, based on the indication of inactivity, the method comprises initiating a process to alter a configuration of radio bearers or data radio bearers for the user equipment from a first radio bearer configuration to a second radio bearer configuration. A first radio bearer or first data radio bearer having a highest transmission frequency among radio bearers or data radio bearers of the first radio bearer configuration has a higher transmission frequency than a radio bearer or data radio bearer having a highest transmission frequency among radio bearers or data radio bearers of the second radio bearer configuration. Thus, the UE is moved to a lower frequency band, e.g., so as to make available resources on high-frequency bands to resource-hungry UEs.

Figure 11:
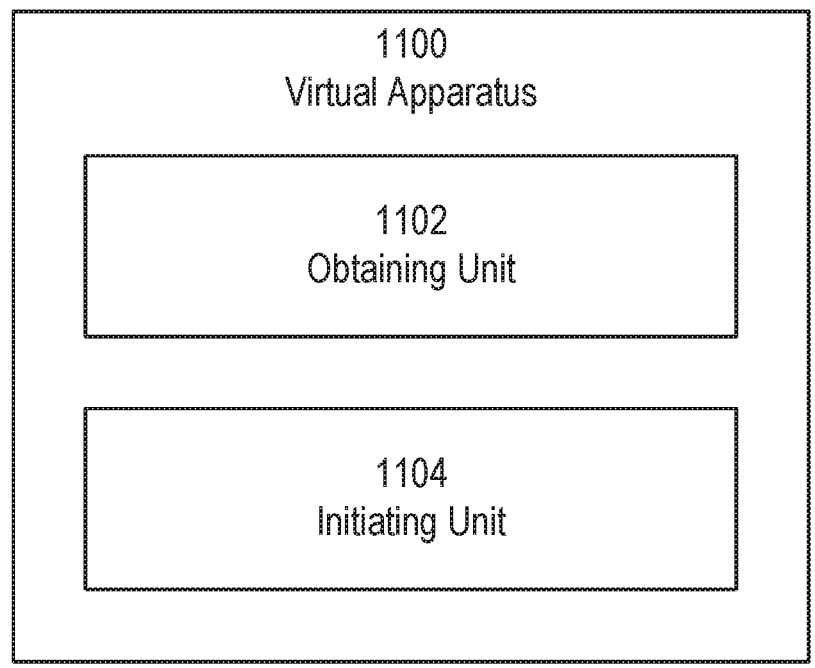
FIG. 11 is a schematic drawing of a virtualization apparatus according to embodiments of the disclosure.

FIG. 11 illustrates a schematic block diagram of an apparatus 1100 in a wireless network (for example, the wireless network shown in FIG. 1). The apparatus may be implemented in a centralized unit of a base station or network node (e.g., the gNB described above). Apparatus 1100 is operable to carry out the example method described with reference to FIG. 10 and possibly any other processes or methods disclosed herein. It is also to be understood that the method of FIG. 10 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments, in some implementations, the processing circuitry may be used to cause obtaining unit 1102 and initiating unit 1104, and any other suitable units of apparatus 1100 to perform corresponding functions according one or more embodiments of the present disclosure.

As illustrated in FIG. 11, apparatus 1100 includes obtaining unit 1102 and initiating unit 1104. Obtaining unit 1102 is configured to obtain an indication of inactivity for a UE. The indication may relate to inactivity in one or more of: one or more data radio bearers established between a user equipment and a distributed unit of a base station for carrying user data, the base station further comprising a centralized unit; and one or more radio bearers established between a user equipment and a base station. The initiating unit 1104 is configured to initiate, based on the indication of inactivity, a process to alter a configuration of radio bearers or data radio bearers for the user equipment from a first radio bearer configuration to a second radio bearer configuration. A first radio bearer or first data radio bearer having a highest transmission frequency among radio bearers or data radio bearers of the first radio bearer configuration has a higher transmission frequency than a radio bearer or data radio bearer having a highest transmission frequency among radio bearers or data radio bearers of the second radio bearer configuration. Thus, the UE is moved to a lower frequency band, e.g., so as to make available resources on high-frequency bands to resource-hungry UEs.

Figure 12:
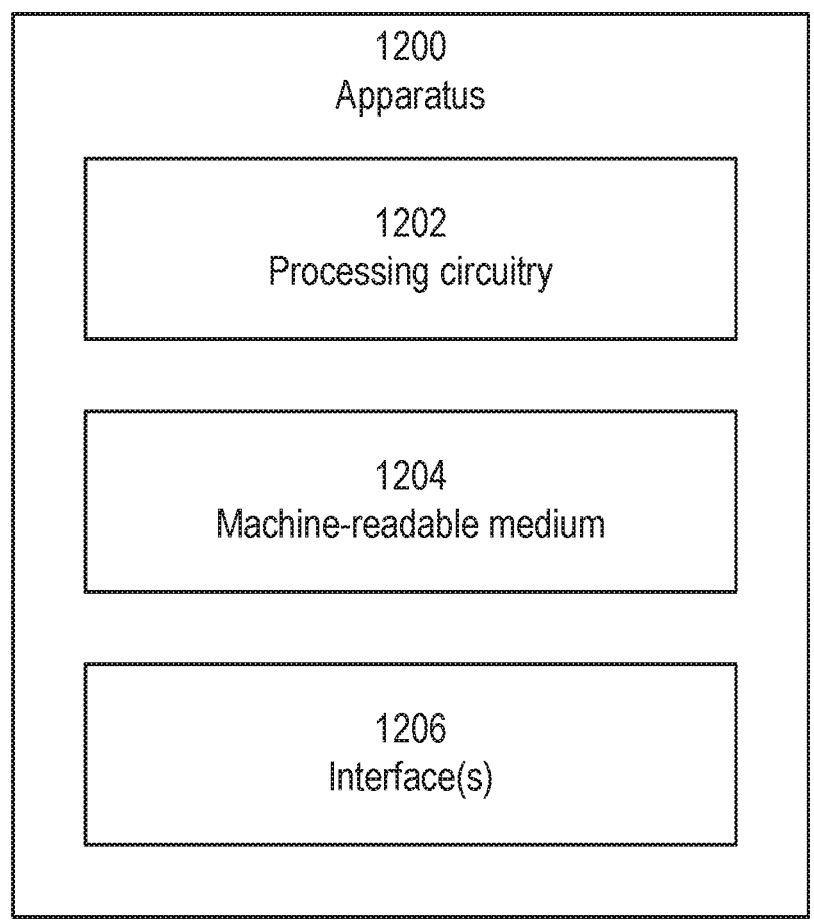
FIG. 12 is a schematic drawing of an apparatus implemented in a network node according to embodiments of the disclosure.

FIG. 12 illustrates a schematic block diagram of an apparatus 1200 in a wireless network (for example, the wireless network shown in FIG. 1). The apparatus may be implemented in a centralized unit of a base station or network node (e.g., the gNB described above). Apparatus 1200 is operable to carry out the example method described with reference to FIG. 10 and possibly any other processes or methods disclosed herein. It is also to be understood that the method of FIG. 10 is not necessarily carried out solely by apparatus 1200. At least some operations of the method can be performed by one or more other entities.

Apparatus 1200 comprises processing circuitry 1202, a non-transitory machine-readable medium 1204, and one or more interfaces 1206. The processing circuitry 1200 may comprise one or more microprocessor or microcontrollers, as well as other digital hardware, which may include digital signal processors (DSPs), special-purpose digital logic, and the like. The machine-readable medium 1204 may comprise memory, which may include one or several types of memory such as read-only memory (ROM), random-access memory, cache memory, flash memory devices, optical storage devices, etc. The machine-readable medium stores instructions which, when executed by the processing circuitry 1202, cause the apparatus 1200 to obtain an indication of inactivity for a UE. The indication may relate to inactivity in one or more of: one or more data radio bearers established between a user equipment and a distributed unit of a base station for carrying user data, the base station further comprising a centralized unit; and one or more radio bearers established between a user equipment and a base station. The apparatus 1200 is further caused to initiate, based on the indication of inactivity, a process to alter a configuration of radio bearers or data radio bearers for the user equipment from a first radio bearer configuration to a second radio bearer configuration. A first radio bearer or first data radio bearer having a highest transmission frequency among radio bearers or data radio bearers of the first radio bearer configuration has a higher transmission frequency than a radio bearer or data radio bearer having a highest transmission frequency among radio bearers or data radio bearers of the second radio bearer configuration.

Figure 13:
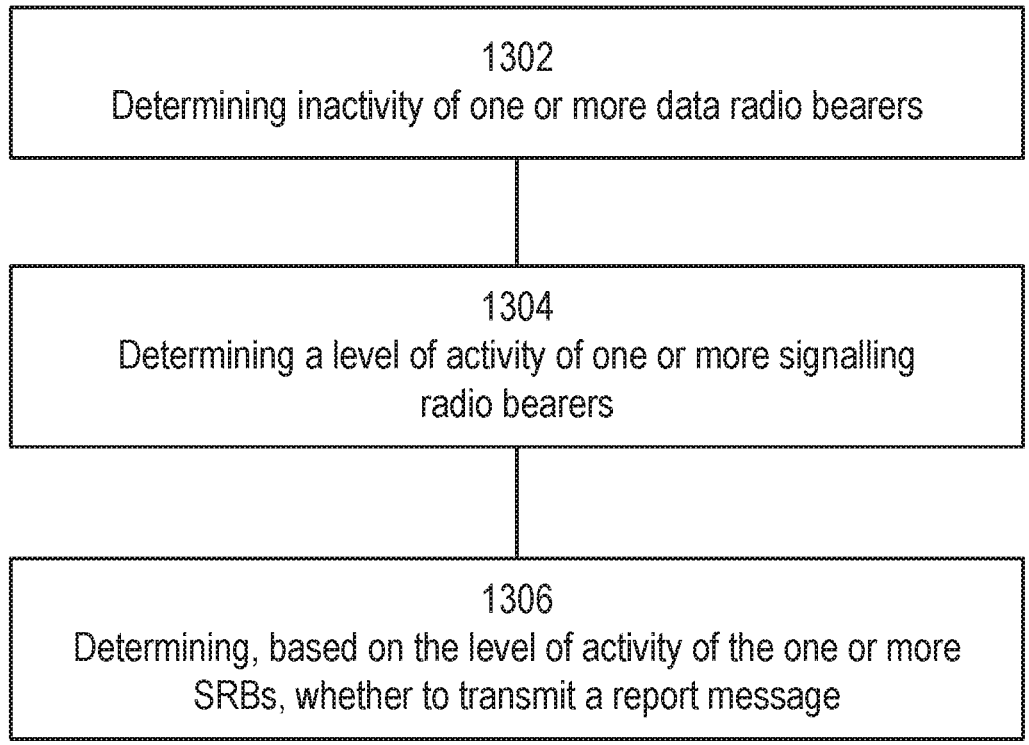
FIG. 13 is a flowchart of a method implemented in a distributed unit of a base station according to embodiments of the disclosure.

FIG. 13 depicts a method in accordance with particular embodiments. The method may be carried out in a distributed unit of a base station. The base station may further comprise a centralized unit. The method begins at step 1302 in which the distributed unit determines inactivity in one or more data radio bearers, established between the distributed unit and a user equipment, for carrying user data. In step 1304, the distributed unit determines a level of activity of one or more signalling radio bearers, established between the distributed unit and the user equipment, for carrying control data. In step 1306, the distributed unit determines, based on the level of activity of the one or more signalling radio bearers, whether to transmit, to the centralized unit, a report message comprising an indication of the activity of the one or more data radio bearers.

Figure 14:
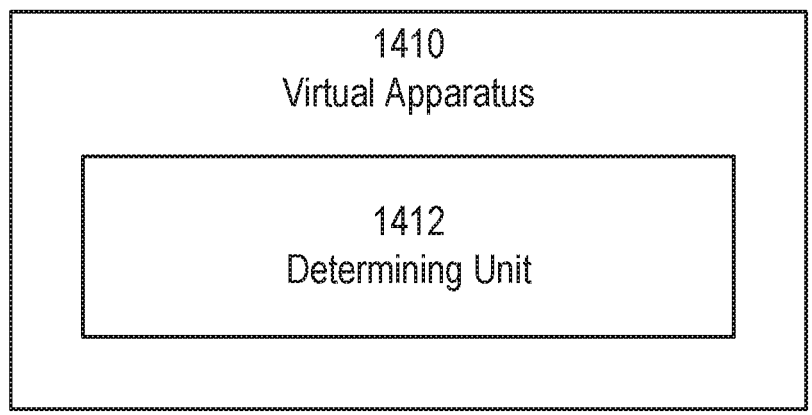
FIG. 14 is a schematic drawing of a virtualization apparatus according to embodiments of the disclosure.

FIG. 14 illustrates a schematic block diagram of an apparatus 1410 in a wireless network (for example, the wireless network shown in FIG. 1). The apparatus may be implemented in a distributed unit of a base station or network node (e.g., the gNB described above). Apparatus 1410 is operable to carry out the example method described with reference to FIG. 13 and possibly any other processes or methods disclosed herein. It is also to be understood that the method of FIG. 13 is not necessarily carried out solely by apparatus 1410. At least some operations of the method can be performed by one or more other entities.

Virtual Apparatus 1410 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining unit 1412, and any other suitable units of apparatus 1410 to perform corresponding functions according to one or more embodiments of the present disclosure.

As illustrated in FIG. 14, apparatus 1410 includes determining unit 1412. Determining unit 1412 is configured to determine inactivity of one or more data radio bearers, established between the distributed unit and a user equipment, for carrying user data; determine a level of activity of one or more signalling radio bearers, established between the distributed unit and the user equipment, for carrying control data; and determine, based on the level of activity of the one or more signalling radio bearers, whether to transmit, to the centralized unit, a report message comprising an indication of the activity of the one or more data radio bearers. It will be understood by those skilled in the art that each of the determining steps may alternatively be carried out by separate modules.

Figure 15:
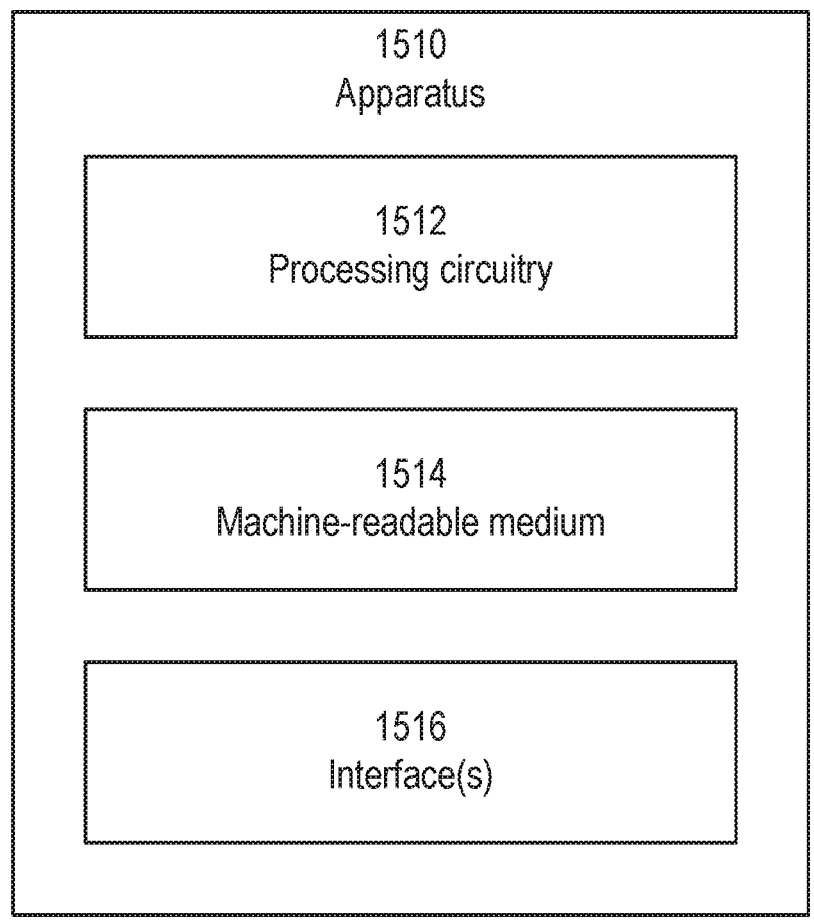
FIG. 15 is a schematic drawing of an apparatus implemented in a distributed unit of a base station according to embodiments of the disclosure.

FIG. 15 illustrates a schematic block diagram of an apparatus 1510 in a wireless network (for example, the wireless network shown in FIG. 1). The apparatus may be implemented in a distributed unit of a base station or network node (e.g., the gNB described above). Apparatus 1510 is operable to carry out the example method described with reference to FIG. 13 and possibly any other processes or methods disclosed herein. It is also to be understood that the method of FIG. 13 is not necessarily carried out solely by apparatus 1510. At least some operations of the method can be performed by one or more other entities.

Apparatus 1510 comprises processing circuitry 1512, a non-transitory machine-readable medium 1514, and one or more interfaces 1516. The processing circuitry 1510 may comprise one or more microprocessor or microcontrollers, as well as other digital hardware, which may include digital signal processors (DSPs), special-purpose digital logic, and the like. The machine-readable medium 1514 may comprise memory, which may include one or several types of memory such as read-only memory (RO M), random-access memory, cache memory, flash memory devices, optical storage devices, etc. The machine-readable medium stores instructions which, when executed by the processing circuitry 1512, cause the apparatus 1510 to determine inactivity of one or more data radio bearers, established between the distributed unit and a user equipment, for carrying user data: determine a level of activity of one or more signalling radio bearers, established between the distributed unit and the user equipment, for carrying control data; and determine, based on the level of activity of the one or more signalling radio bearers, whether to transmit, to the centralized unit, a report message comprising an indication of the activity of the one or more data radio bearers.

Figure 16:
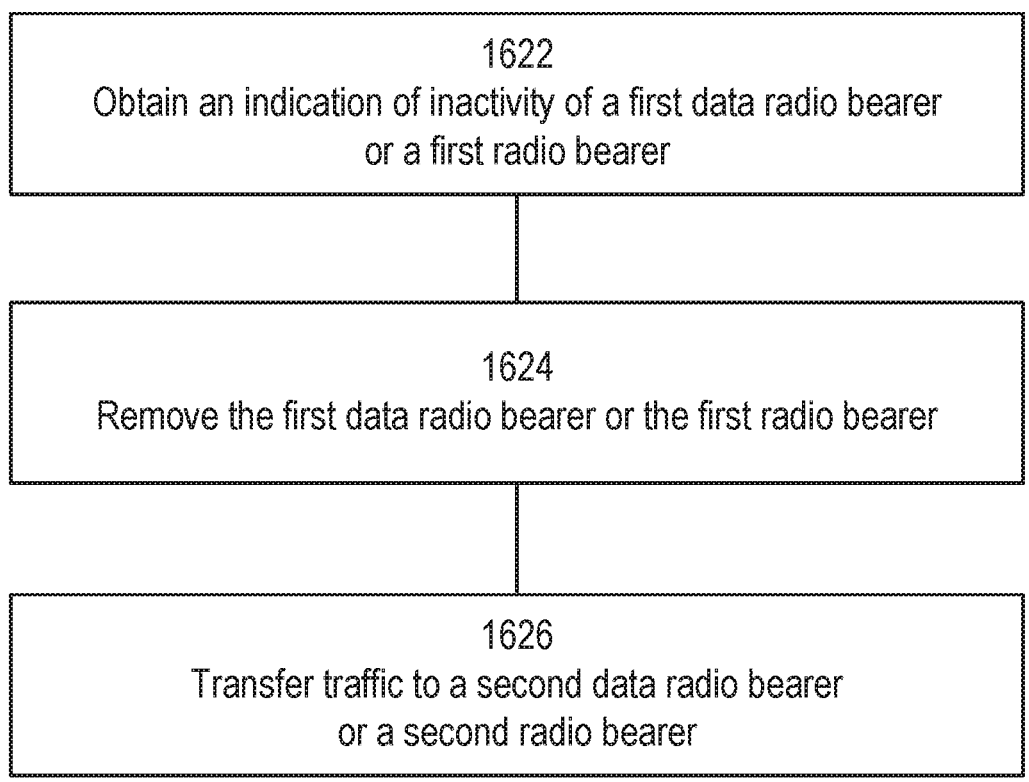
FIG. 16 is a flowchart of a method implemented in a network node according to embodiments of the disclosure.

FIG. 16 depicts a method in accordance with particular embodiments. The method may be carried out in a network node for a wireless communication network (e.g. a base station, or a centralized unit of a base station). The base station may further comprise a distributed unit.

The method begins at step 1622 in which the network node obtains an indication of inactivity of one or more of: a first data radio bearer of a plurality of data radio bearers established between a user equipment and one or more distributed units of a base station for carrying user data, the base station further comprising a centralized unit; and a first radio bearer of a plurality of radio bearers established between a base station and a user equipment. In step 1624, based on the indication of inactivity, the network node removes (e.g. tears down) the first data radio bearer or the first radio bearer from a radio bearer configuration for the user equipment, and further, in step 1626, transfers traffic intended for the first radio bearer or first data radio bearer to a second radio bearer of the plurality of radio bearers or a second data radio bearer of the plurality of data radio bearers.

Figure 17:
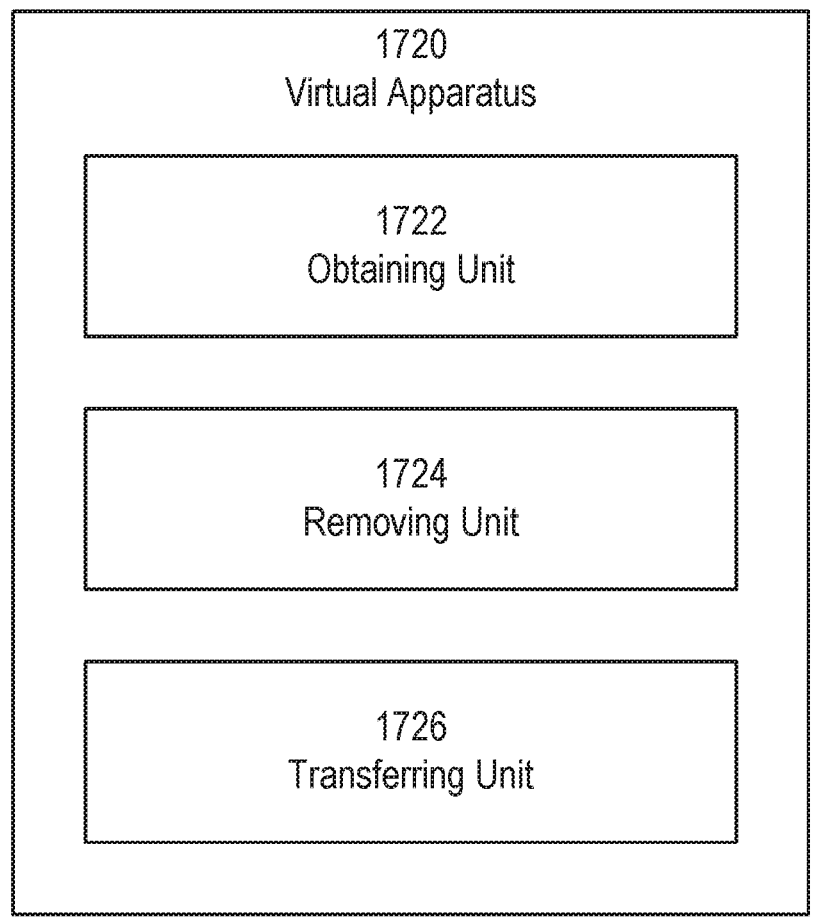
FIG. 17 is a schematic drawing of a virtualization apparatus according to embodiments of the disclosure.

FIG. 17 illustrates a schematic block diagram of an apparatus 1720 in a wireless network (for example, the wireless network shown in FIG. 1). The apparatus may be implemented in a network node for a wireless communication network (e.g. a base station, or a centralized unit of a base station). The base station may further comprise a distributed unit. Apparatus 1720 is operable to carry out the example method described with reference to FIG. 16 and possibly any other processes or methods disclosed herein. It is also to be understood that the method of FIG. 16 is not necessarily carried out solely by apparatus 1720. At least some operations of the method can be performed by one or more other entities.

Virtual Apparatus 1720 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments, in some implementations, the processing circuitry may be used to cause obtaining unit 1722, removing unit 1724 and transferring unit 1726, and any other suitable units of apparatus 1720 to perform corresponding functions according to one or more embodiments of the present disclosure.

As illustrated in FIG. 17, apparatus 1720 includes obtaining unit 1722, removing unit 1724 and transferring unit 1726. Obtaining unit 1722 is configured to obtain an indication of inactivity of one or more of: a first data radio bearer of a plurality of data radio bearers established between a user equipment and one or more distributed units of a base station for carrying user data, the base station further comprising a centralized unit; and a first radio bearer of a plurality of radio bearers established between a base station and a user equipment. Removing unit 1724 is configured to remove, based on the indication of inactivity, the first data radio bearer or the first radio bearer from a radio bearer configuration for the user equipment. Transferring unit 1726 is configured to transfer, also based on the indication of inactivity, traffic intended for the first radio bearer or first data radio bearer to a second radio bearer of the plurality of radio bearers or a second data radio bearer of the plurality of data radio bearers.

Figure 18:
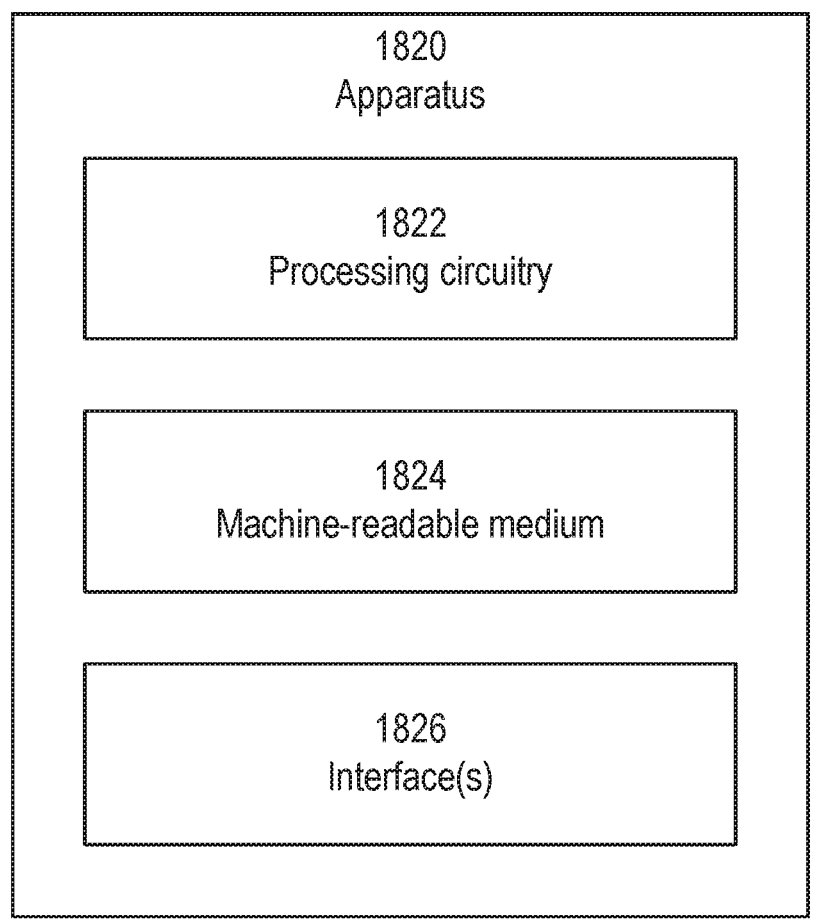
FIG. 18 is a schematic drawing of an apparatus implemented in a network node according to embodiments of the disclosure.

FIG. 18 illustrates a schematic block diagram of an apparatus 1820 in a wireless network (for example, the wireless network shown in FIG. 1). The apparatus may be implemented in a centralized unit of a base station or network node (e.g., the gNB described above). Apparatus 1820 is operable to carry out the example method described with reference to FIG. 16 and possibly any other processes or methods disclosed herein. It is also to be understood that the method of FIG. 16 is not necessarily carried out solely by apparatus 1820. At least some operations of the method can be performed by one or more other entities.

Apparatus 1820 comprises processing circuitry 1822, a non-transitory machine-readable medium 1824, and one or more interfaces 1826. The processing circuitry 1820 may comprise one or more microprocessor or microcontrollers, as well as other digital hardware, which may include digital signal processors (DSPs), special-purpose digital logic, and the like. The machine-readable medium 1824 may comprise memory, which may include one or several types of memory such as read-only memory (ROM), random-access memory, cache memory, flash memory devices, optical storage devices, etc. The machine-readable medium stores instructions which, when executed by the processing circuitry 1822, cause the apparatus 1820 to obtain an indication of inactivity of one or more of: a first data radio bearer of a plurality of data radio bearers established between a user equipment and one or more distributed units of a base station for carrying user data, the base station further comprising a centralized unit; and a first radio bearer of a plurality of radio bearers established between a base station and a user equipment; based on the indication of inactivity, remove (e.g. tears down) the first data radio bearer or the first radio bearer from a radio bearer configuration for the user equipment;

and further based on the indication of inactivity, transfer traffic intended for the first radio bearer or first data radio bearer to a second radio bearer of the plurality of radio bearers or a second data radio bearer of the plurality of data radio bearers.

The disclosure above has focussed on the reporting of inactivity on the level of radio bearers and data radio bearers. Those skilled in the at will appreciate that inactivity may be reported at a different granular level without departing substantially from the scope of the description above and the embodiments set out below. For example, inactivity may be monitored and/or reported per QoS flow (which is a finer granularity than the data radio bearer). As with all of the embodiments set out above, the activity may be monitored in the DU and reported to the CU, or monitored in the CU. In either case, the CU may determine that a particular data radio bearer is inactive only when all the QoS flows associated with the data radio bearer have been indicated or determined as being inactive.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The following numbered statements set out embodiments of the disclosure:

Group A Embodiments

1. A method in a network node for a wireless communication network, the method comprising:
    obtaining an indication of inactivity of one or more of:
       one or more data radio bearers established between a user equipment and a distributed unit of a base station for carrying user data, the base station further comprising a centralized unit; and
       one or more radio bearers established between a user equipment and a base station; and
    based on the indication of inactivity, initiating a process to alter a configuration of radio bearers or data radio bearers for the user equipment from a first radio bearer configuration to a second radio bearer configuration,
    wherein a first radio bearer or first data radio bearer having a highest transmission frequency among radio bearers or data radio bearers of the first radio bearer configuration has a higher transmission frequency than a radio bearer or data radio bearer having a highest transmission frequency among radio bearers or data radio bearers of the second radio bearer configuration.
2. The method according to embodiment 1, wherein the indication of the activity comprises an indication that at least one of the one or more radio bearers or data radio bearers is inactive.
3. The method according to embodiment 2, wherein the indication of the activity comprises an indication that all of the one or more radio bearers or one or more data radio bearers is inactive.
4. The method according to embodiment 1 or 2, wherein the indication of the activity comprises respective indications for each of the one or more radio bearers or one or more data radio bearers, as to whether the respective radio bearer or radio data bearer is inactive.
5. The method according to any one of the preceding embodiments, wherein the network node is the centralized unit.
6. The method according to embodiment 5, wherein obtaining an indication of inactivity comprises receiving a report message from the distributed unit comprising the indication of inactivity.
7. The method according to embodiment 6, wherein the report message comprises a UE Context Modification Required message
8. The method according to embodiment 5, wherein obtaining an indication of inactivity comprises monitoring the activity of the one or more radio bearers or the one or more data radio bearers.
9. The method according to embodiment 8, wherein the monitoring is performed in a user plane entity implemented in the centralized unit.
10. The method according to embodiment 9, wherein the monitoring is performed in a packet data convergence protocol, PDCP, layer in the user plane entity.
11. The method according to any one of embodiments 1 to 4, wherein the network node is communicatively coupled to the centralized unit.
12. The method according to embodiment 11, wherein obtaining an indication of inactivity comprises receiving a report message from the centralized unit comprising the indication of inactivity of one or more radio bearers.
13. A method in a distributed unit of a base station, the base station further comprising a centralized unit, the method comprising:
    determining inactivity of one or more data radio bearers, established between the distributed unit and a user equipment, for carrying user data;
    determining a level of activity of one or more signalling radio bearers, established between the distributed unit and the user equipment, for carrying control data; and
    determining, based on the level of activity of the one or more signalling radio bearers, whether to transmit, to the centralized unit, a report message comprising an indication of the activity of the one or more data radio bearers.
14. The method according to embodiment 13, wherein determining whether to transmit a report message comprises comparing the level of activity of one or more signalling radio bearers to one or more thresholds, and determining whether to transmit the report message based on the comparison.
15. The method according to embodiment 14, further comprising, responsive to the level of activity exceeding the threshold, refraining from transmitting the report message.
16. The method according to embodiment 14 or 15, further comprising, responsive to the level of activity being lower than the threshold, transmitting the report message.
17. A method in a network node for a wireless communication network, the method comprising:
    obtaining an indication of inactivity of one or more of:
       a first data radio bearer of a plurality of data radio bearers established between a user equipment and one or more distributed units of a base station for carrying user data, the base station further comprising a centralized unit, and a first radio bearer of a plurality of radio bearers established between a base station and a user equipment; and based on the indication of inactivity:
removing the first data radio bearer or the first radio bearer from a radio bearer configuration for the user equipment; and
transferring traffic intended for the first radio bearer or first data radio bearer to a second radio bearer of the plurality of radio bearers or a second data radio bearer of the plurality of data radio bearers.

18. The method according to embodiment 17, wherein the first radio bearer or first data radio bearer is established between the user equipment and a first distributed unit, and the second radio bearer or second data radio bearer is established between the user equipment a second distributed unit.

19. The method according to embodiment 18, wherein the steps of removing the first radio bearer and transferring traffic to the second radio bearer or removing the first data radio bearer and transferring traffic to the second data radio bearer are further performed responsive to a determination that transfer of traffic intended for the first radio bearer to the second radio bearer or transfer of traffic intended for the first data radio bearer to the second data radio bearer will not cause an overload condition in the second distributed unit.

20. The method according to embodiment 19, wherein determining whether transfer of traffic intended for the first radio bearer to the second radio bearer will cause an overload condition in the second distributed unit comprises comparing a sum of the traffic intended for the first radio bearer and traffic intended for the second radio bearer to a threshold or wherein determining whether transfer of traffic intended for the first data radio bearer to the second data radio bearer will cause an overload condition in the second distributed unit comprises comparing a sum of the traffic intended for the first data radio bearer and traffic intended for the second data radio bearer to a threshold.

21. The method according to any one of embodiments 17 to 20, wherein the first radio bearer or first data radio bearer is indicated as inactive if a level of activity falls below a threshold for a period of time.

22. The method according to any one of the preceding embodiments, wherein the network node is the centralized unit.

23. The method according to embodiment 22, wherein obtaining an indication of inactivity of the first data radio bearer comprises receiving a report message from the distributed unit comprising the indication of inactivity of the first data radio bearer.

24. The method according to embodiment 23, wherein the report message comprises a UE Context Modification Required message 25. The method according to embodiment 22, wherein obtaining an indication of inactivity of the first radio bearer comprises monitoring the activity of the first radio bearer or wherein obtaining an indication of inactivity of the first data radio bearer comprises monitoring the activity of the first data radio bearer.

26. The method according to embodiment 25, wherein the monitoring is performed in a user plane entity implemented in the centralized unit.

27. The method according to embodiment 26, wherein the monitoring is performed in a packet data convergence protocol, PDCP, layer in the user plane entity.

28. The method according to any one of embodiments 17 to 21, wherein the network node is communicatively coupled to the centralized unit.

29. The method according to any one of the preceding embodiments, wherein the centralized unit implements one or more of: a Radio Resource Control (RRC), a Service Data Adaptation Protocol (SDAP) and a Packet Data Convergence Protocol PDCP protocol.

30. The method according to any one of the preceding embodiments, wherein the distributed unit implements one or more of: a Radio Link Control (RLC) protocol, a Medium Access Control (MAC) protocol and the physical layer of the air interface.

Group B Embodiments

31. A base station comprising:
processing circuitry configured to perform any of the steps of any of the Group A embodiments;
power supply circuitry configured to supply power to the wireless device.

32. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group A embodiments.

33. The communication system of the previous embodiment further including the base station.

34. The communication system of the previous 2 embodiments, further including the UE, wherein the UE is configured to communicate with the base station.

35. The communication system of the previous 3 embodiments, wherein:
the processing circuitry of the host computer is configured to execute a host application, thereby providing the user data; and
the UE comprises processing circuitry configured to execute a client application associated with the host application.

36. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group A embodiments.

37. The method of the previous embodiment, further comprising, at the base station, transmitting the user data.

38. The method of the previous 2 embodiments, wherein the user data is provided at the host computer by executing a host application, the method further comprising, at the UE, executing a client application associated with the host application.

39. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group A embodiments.

40. The communication system of the previous embodiment further including the base station.
41. The communication system of the previous 2 embodiments, further including the UE, wherein the UE is configured to communicate with the base station.
42. The communication system of the previous 3 embodiments, wherein:
    the processing circuitry of the host computer is configured to execute a host application; the UE is configured to execute a client application associated with the host application, thereby providing the user data to be received by the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

5GC 5G Core Network
5GS 5G System
AMF Access and Mobility Management Function
CP Control Plane
CU Centralized Unit
CU-CP CU Control Plane
CU-UP CU User Plane
DL Downlink
DRB Data Radio Bearer
DU Distributed Unit
E1 Interface between a CU-UP and a CU-CP
eNB E-UTRAN NodeB
EN-DC EUTRAN-NR Dual Connectivity
EPS Evolved Packet System
E-ULTRA, Evolved UTRA
E-UTRAN Evolved UTRAN
F1 Interface between a gNB-CU and gNB-DU
F1AP F1 Application Protocol for the F1 interface part between the CU-CP part of gNB-CU and gNB-DU
eNB E-UTRAN NodeB or evolved NodeB. A RAN node (base station) supporting the LTE air interface for communication with UEs.
gNB A RAN node (base station) supporting the New Radio (NR) air interface for communication with UEs.
gNB-CU gNB Central Unit
gNB-DU gNB Distributed Unit
LTE Long Term Evolution
NG Interface between a gNB and the AMF
NG-Flex Function for flexible establishment of the NG interface between a gNB and an AMF
NG-RAN NG Radio Access Network
PDCP Packet Data Convergence Protocol
QoS Quality of Service
RAN Radio Access Network
RNL Radio Network Layer
RRC Radio Resource Control
SDAP Service Data Adaptation Protocol
TNL Transport Network Layer
TTI Transmission Time interval
UE User Equipment
UL Uplink
UP User Plane
UMTS Universal Mobile Telecommunication System
UTRA UMTS Terrestrial Radio Access
UTRAN UMTS Terrestrial Radio Access Network
X2 Interface between an eNB and a gNB for the EN-DC scenario
X2AP X2 Application Protocol for the X2 control plane interface between an eNB and a gNB or between two eNBs
X2-C X2 Control plane
S1 interface between an eNB and the MME
S1-U S1 User plane interface between the eNB and the S-GW
S-GW Serving Gateway
Xn Interface between two gNBs or between an eNB and a gNB in non-EN-DC cases
XnAP Xn Application Protocol
Xn-C Xn Control Plane
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method in a distributed unit of a base station, the base station further comprising a centralized unit, the method comprising:
    determining inactivity of one or more data radio bearers, established between the distributed unit and a user equipment, for carrying user data;
    determining a level of activity of one or more signaling radio bearers, established between the distributed unit and the user equipment, for carrying control data; and
    determining, based on the level of activity of the one or more signaling radio bearers, whether to transmit, to the centralized unit, a report message comprising an indication of the inactivity of the one or more data radio bearers.

2. The method of claim 1, wherein determining whether to transmit a report message comprises comparing the level of activity of one or more of the one or more signaling radio bearers to one or more thresholds and determining whether to transmit the report message based on the comparison, and wherein the method further comprises refraining from transmitting the report message, responsive to the level of activity exceeding the threshold.

3. A method in a network node for a wireless communication network, the method comprising:
    obtaining an indication of inactivity of a first data radio bearer of a plurality of data radio bearers established between a user equipment and one or more distributed units of a base station for carrying user data, the base station further comprising a centralized unit; and
    based on the indication of inactivity:
        removing the first data radio bearer from a radio bearer configuration for the user equipment; and
        transferring traffic intended for the first data radio bearer to a second data radio bearer of the plurality of data radio bearers.

4. The method of claim 3, wherein the first data radio bearer is established between the user equipment and a first distributed unit, and the second data radio bearer is established between the user equipment and a second distributed unit.

5. The method of claim 4, wherein the steps of removing the first data radio bearer and transferring traffic to the second data radio bearer are performed responsive further to a determination that transfer of traffic intended for the first data radio bearer to the second data radio bearer will not cause an overload condition in the second distributed unit.

6. A distributed unit for a base station, the base station further comprising a centralized unit, the distributed unit comprising processing circuitry and a memory storing instructions that, when executed by the processing circuitry, cause the distributed unit to:
    determine inactivity of one or more data radio bearers, established between the distributed unit and a user equipment, for carrying user data;
    determine a level of activity of one or more signaling radio bearers, established between the distributed unit and the user equipment, for carrying control data; and
    determine, based on the level of activity of the one or more signaling radio bearers, whether to transmit, to the centralized unit, a report message comprising an indication of the inactivity of the one or more data radio bearers.

7. The distributed unit of claim 6, wherein the distributed unit is configured to determine whether to transmit a report message by comparing the level of activity of one or more of the one or more signaling radio bearers to one or more thresholds and determining whether to transmit the report message based on the comparison.

8. The distributed unit of claim 7, wherein the distributed unit is configured to refrain from transmitting the report message responsive to the level of activity exceeding the threshold.

9. The distributed unit of claim 7, wherein the distributed unit is configured to transmit the report message responsive to the level of activity being lower than the threshold.

10. A network node for a wireless communication network, the network node comprising processing circuitry and a memory storing instructions that, when executed by the processing circuitry, cause the network node to:
    obtain an indication of inactivity of a first data radio bearer of a plurality of data radio bearers established between a user equipment and one or more distributed units of a base station for carrying user data, the base station further comprising a centralized unit; and
    based on the indication of inactivity:
    remove the first data radio bearer from a radio bearer configuration for the user equipment; and
    transfer traffic intended for the first data radio bearer to a second data radio bearer of the plurality of data radio bearers.

11. The network node of claim 10, wherein the first data radio bearer is established between the user equipment and a first distributed unit, and the second data radio bearer is established between the user equipment and a second distributed unit.

12. The network node of claim 11, wherein the network node is configured to remove the first data radio bearer and transfer traffic to the second data radio bearer responsive to a determination that transfer of traffic intended for the first data radio bearer to the second data radio bearer will not cause an overload condition in the second distributed unit.

13. The network node of claim 12, wherein the network node is configured to determine whether transfer of traffic intended for the first data radio bearer to the second data radio bearer will cause an overload condition in the second distributed unit by comparing a sum of the traffic intended for the first data radio bearer and traffic intended for the second data radio bearer to a threshold.

14. The network node of claim 10, wherein the network node is the centralized unit.

15. The network node of claim 14, wherein the network node is configured to obtain an indication of inactivity of the first data radio bearer by receiving a report message from the distributed unit comprising the indication of inactivity of the first data radio bearer.

16. The network node of claim 14, wherein the network node is configured to obtain an indication of inactivity of the first data radio bearer by monitoring the activity of the first data radio bearer.

17. The network node of claim 16, wherein the network node is configured to monitor the activity of the first data radio bearer in a user plane entity implemented in the centralized unit.

18. The network node of claim 17, wherein the network node is configured to monitor the activity of the first data radio bearer in a packet data convergence protocol (PDCP) layer in the user plane entity.

19. The network node of claim 10, wherein the centralized unit implements one or more of: a Radio Resource Control (RRC), a Service Data Adaptation Protocol (SDAP), and a Packet Data Convergence Protocol (PDCP).

20. The network node of claim 10, wherein the distributed unit implements one or more of: a Radio Link Control (RLC), a Medium Access Control (MAC), and the physical layer of the air interface.

* * * * *